(12) United States Patent
Nation et al.

(10) Patent No.: US 8,239,700 B2
(45) Date of Patent: Aug. 7, 2012

(54) SYSTEMS AND METHODS FOR POWER DISSIPATION CONTROL IN A SEMICONDUCTOR DEVICE

(75) Inventors: George Nation, Rochester, MN (US); Jon W. Byrn, Fort Collins, CO (US); Gary Delp, Rochester, MN (US)

(73) Assignee: LSI Corporation, Milpitas, CA (US)

( * ) Notice: Subject to any disclaimer, the term of this patent is extended or adjusted under 35 U.S.C. 154(b) by 582 days.

(21) Appl. No.: 12/425,532

(22) Filed: Apr. 17, 2009

(65) Prior Publication Data

US 2010/0264983 A1 Oct. 21, 2010

(51) Int. Cl.
G06F 1/32 (2006.01)

(52) U.S. Cl. .......... 713/324; 713/322; 713/323; 714/22; 327/538

(58) Field of Classification Search .......... 713/322–324; 714/22; 327/538
See application file for complete search history.

(56) References Cited

U.S. PATENT DOCUMENTS

| | | | |
|---|---|---|---|
| 5,544,138 A | 8/1996 | Bajorek et al. | |
| 5,715,467 A | 2/1998 | Jirgal | |
| 6,775,787 B2* | 8/2004 | Greene | 713/340 |
| 6,973,583 B2 | 12/2005 | Kobori | |
| 6,983,389 B1 | 1/2006 | Filippo | |
| 7,055,117 B2 | 5/2006 | Yee | |
| 7,203,857 B2 | 4/2007 | Hamilton | |
| 7,739,533 B2 | 6/2010 | Rauschmayer et al. | |
| 7,873,823 B2* | 1/2011 | Shankar | 713/100 |
| 2004/0060024 A1 | 3/2004 | Bednar et al. | |
| 2004/0255177 A1 | 12/2004 | Hamilton | |
| 2005/0163237 A1 | 7/2005 | Katanaya | |
| 2005/0174076 A1 | 8/2005 | Katanaya | |
| 2006/0107077 A1 | 5/2006 | Roth et al. | |
| 2006/0123259 A1 | 6/2006 | Yokota et al. | |
| 2006/0230299 A1* | 10/2006 | Zaretsky et al. | 713/320 |
| 2007/0006012 A1* | 1/2007 | Mosur et al. | 713/600 |
| 2008/0077818 A1* | 3/2008 | Rauschmayer et al. | 713/400 |
| 2010/0205462 A1 | 8/2010 | Rauschmayer et al. | |
| 2010/0218020 A1 | 8/2010 | Rauschmayer et al. | |
| 2010/0268917 A1 | 10/2010 | Nation et al. | |

FOREIGN PATENT DOCUMENTS

WO WO 2004/023268 3/2004

OTHER PUBLICATIONS

International Business Machines, "Adaptive Power Management for Mobile Hard Drives", white paper dated Apr. 1999. See www.almaden.ibm.com/almaden/mobile_hard_drives.html.

* cited by examiner

Primary Examiner — Thuan Du

(74) Attorney, Agent, or Firm — Hamilton, DeSanctis & Cha

(57) ABSTRACT

Various embodiments of the present invention provide systems and methods for governing power dissipation in a semiconductor device. For example, various embodiments of the present invention provide semiconductor devices that include a first function circuit, a second function circuit, and a power state change control circuit. The power state change control circuit is operable to determine a combination of power states of the first function circuit and the second function circuit that provides an overall power dissipation within a power dissipation level.

21 Claims, 10 Drawing Sheets

SYSTEMS AND METHODS FOR POWER DISSIPATION CONTROL IN A SEMICONDUCTOR DEVICE

BACKGROUND OF THE INVENTION

The present inventions are related to systems and methods for controlling power dissipation in a semiconductor device, and more particularly to systems and methods for governing power state transition in a semiconductor device.

Modern semiconductor devices employ a variety of techniques for reducing power consumption. For example, where a portion of a design is not utilized, dynamic power dissipation may be reduced by limiting the amount of switching occurring in the transistors of the design. As dynamic power consumption has traditionally represented a significant portion of power consumed by a semiconductor device, such an approach has provided reasonable control over unnecessary power consumption. As semiconductor technologies have continued to advance, static power consumption due to leakage currents has become an increasing percentage of overall power consumption. To deal with this, additional methods for limiting power consumption in unused portions of a design have been developed. For example, power islands have been utilized that allow for all power to be switched off or otherwise adjusted to particular regions of the semiconductor device.

The aforementioned approaches for power management, while generally effective, can be problematic. For example, in a typical scenario, a portion of a design that was previously powered down through use of one or both of the aforementioned processes may be called for a subsequent operation. In such a case, power is reapplied and/or clocks are restarted to the portion of the design as it is awoken in preparation for performing a desired function. This power on process can result in an inrush current that may damage portions of the design and/or cause a temporary circuit instability.

FIG. 1 shows an example of a potentially damaging inrush current 170. During an initial steady state operational period 105, current at a level 140 is consumed. At a point, power to the circuit is reduced for operation during a low power operational period 110. During low power operational period 110, current at a relatively low level 160 is consumed. Once the circuit is again needed, current is increased to the circuit during a transient operational period 115. During transient operational period 115, current to the circuit increases from level 160 to level 150. As an artifact of the quickly transitioning current, an overshoot 180 occurs taking the current to a level substantially above level 150. Eventually, the level returns to level 150 associated with steady state operational period 120. Even though the current eventually stabilizes at a desired level, inrush current 170 can result in damage to the semiconductor device and/or a power regulator associated with the design. Such an inrush current must be accounted for in the design margin. This is an addition to the current budget/margin that produces no computational value and may add to package cost through the bloating of design margin. To reduce inrush current 170 and overshoot 180, a large capacitive load or another damping filter may be used in the design. Such an approach works reasonably well for reducing damage, but adds cost to what in many cases are very cost sensitive designs.

Hence, for at least the aforementioned reasons, there exists a need in the art for advanced systems and methods for providing power management in a semiconductor device.

BRIEF SUMMARY OF THE INVENTION

The present inventions are related to systems and methods for controlling power dissipation in a semiconductor device, and more particularly to systems and methods for governing power state transition in a semiconductor device.

Various embodiments of the present invention provide semiconductor devices that include at least a first function circuit and a second function circuit, and a power state change control circuit. The power state change control circuit is operable to transition the power state of the first function circuit from a reduced power state to an operative power state, and to transition the second function circuit from a reduced power state to an operative power state. Transition of the power state of at least one of the first function circuit and the second function circuit is done in at least a first stage at a first time and a second stage at a second time, with the second time being after the first time.

In some instances of the aforementioned embodiments, the first function circuit is powered by a power island, and utilizes a system clock that is gated and un-gated using a clock gating circuit. In such instances, the first stage may include a third stage at a third time and a fourth stage at a fourth time. The third stage includes applying power to the power island, and the fourth stage includes un-gating the system clock using the clock gating circuit. In other instances of the aforementioned embodiments, the first function circuit includes a first sub-function circuit and a second sub-function circuit. In such instances, the first stage may include a third stage at a third time and a fourth stage at a fourth time. The third stage includes modifying the power state of the first sub-function circuit, and the fourth stage includes modifying the power state of the second sub-function circuit. In various instances of the aforementioned embodiments, the first stage includes modifying the power state of the first function circuit, and the second stage includes modifying the power state of the second function circuit.

In one or more instances of the aforementioned embodiments, the semiconductor device further includes an activity prediction and power sequencing control circuit that is operable to identify the first time and the second time. In some cases, the activity prediction and power sequencing control circuit includes: an instruction decoder circuit and a next process scheduler circuit. The instruction decoder circuit is operable to decode a received instruction. Execution of the received instruction involves execution of the first function circuit and the second function circuit. The next process scheduler circuit is operable to schedule a power state transition of the first function circuit by the first time and to schedule a power state transition of the second function circuit by the second time. In some cases, the next process scheduler circuit includes: a function based next process scheduler circuit and a power based next process scheduler circuit. The function based next process scheduler circuit is operable to a start of operation of the first function circuit at the first time and to schedule a start of operation of the second function circuit at the second time, and the power based next process scheduler circuit is operable to schedule the power state transition of the first function circuit by the first time and to schedule the power state transition of the second function circuit by the second time. In Some cases, the first time and the second time are predictively identified based at least in part on a received instruction. In various cases, the first time and the second time are predictively identified based at least in part on a received instruction and an execution status of at least one of the first function circuit and the second function circuit.

Other embodiments of the present invention provide methods for power management in a semiconductor device. Such methods include providing a semiconductor device with at least a first function circuit and a second function circuit, and determining a power state transition for the semiconductor device. The power state transition includes transitioning the power state of at least one of the first function circuit and the second function circuit across multiple stages including at least a first stage at a first time and a second stage at a second time. In some instances of the aforementioned embodiments, the first stage includes modifying the power state of the first function circuit, and the second stage includes modifying the power state of the second function circuit.

In various instances of the aforementioned embodiments, the method further includes receiving an instruction; decoding the instruction to provide a decoded instruction; and identifying the first time and the second time based at least in part on the decoded instruction. In particular cases, identifying the first time and the second time is further based in part on an operational status of the semiconductor device. In some cases, the method further includes: scheduling a power state transition of the first function circuit by the first time; and scheduling a power state transition of the second function by the second time.

Yet other embodiments of the present invention provide hard disk drive controllers that include a first function circuit, a second function circuit, and a power state change control circuit. The power state change control circuit includes: an instruction decoder and a next process scheduler circuit. The instruction decoder is operable to receive an instruction and to identify at least the first function circuit and the second function circuit for execution of the instruction. The next process scheduler circuit is operable to schedule a power state transition of the first function circuit by the first time and to schedule a power state transition of the second function circuit by the second time.

Yet further embodiments of the present invention provide semiconductor devices that include a first function circuit, a second function circuit, and a power state change control circuit. The power state change control circuit is operable to determine a combination of power states of the first function circuit and the second function circuit that provides an overall power dissipation within a power dissipation level. In some instances of the aforementioned embodiments, the power states of the first function circuit and the second function circuit includes transitioning the first function circuit to an operative power state, and transitioning the second function circuit to a reduced power state. In some such instances, the second function circuit is powered by a power island, and transitioning the second circuit to the reduced power state includes removing power from the power island. In other such instances, the second function circuit utilizes a system clock that is gated and un-gated using a clock gating circuit, and transitioning the second circuit to the reduced power state includes gating the system clock. In various instances of the aforementioned embodiments, the second function circuit includes a first sub-function circuit and a second sub-function circuit, and the reduced power state reduces power consumption by the first sub-function circuit and maintains power consumption by the second sub-function circuit.

Various instances of the aforementioned embodiments further include a comparator circuit that compares the overall power dissipation corresponding to the combination of the power states of the first function circuit and the second function circuit with the power dissipation level. In some cases, the power dissipation level is programmable. In other cases, it is fixed. In various cases, the combination of power states of the first function circuit and the second function is statically determined at design-time. In other cases, the combination of power states of the first function circuit and the second function is dynamically determined at run-time. In some such cases, the semiconductor device further includes a lookup table having power dissipation values corresponding to different power states of the first function circuit and the second function circuit. In such cases, the overall power dissipation corresponding to the combination of the power states of the first function circuit and the second function circuit is derived from one or more power dissipation values accessed from the lookup table.

Yet additional embodiments of the present invention provide methods for maintaining power dissipation in a semiconductor device within a defined limit. The methods include: providing a semiconductor device including a first function circuit and a second function circuit; determining a power state transition for the semiconductor device, where the power state transition includes transitioning the power state of both the first function circuit and the second function circuit; determining a combination of power states of the first function circuit and the second function circuit that provides an overall power dissipation within a power dissipation level; and transitioning the first function circuit and the second function circuit to the determined combination of power states.

Yet further embodiments of the present invention provide hard disk controllers that include a first function circuit, a second function circuit, and a power state change control circuit. The power state change control circuit includes an instruction decoder and a next process scheduler circuit. The instruction decoder circuit is operable to receive an instruction and to identify at least the first function circuit and the second function circuit for execution of the instruction. The next process scheduler circuit is operable to determine a combination of power states of the first function circuit and the second function circuit that provides an overall power dissipation within a power dissipation level, and to schedule a transition of the determined power states.

Other embodiments of the present invention provide methods for semiconductor design. The methods include receiving a semiconductor design with at least a first function circuit and a second function circuit; simulating the semiconductor design using a first instruction and a second instruction; determining a power state transition between the first instruction and the second instruction; and augmenting the semiconductor design to implement the determined power state transition. Simulating the semiconductor design using a first instruction and a second instruction identifies an indication of a first subset of the first function circuit and the second function circuit used in executing the first instruction and a second subset of the first function circuit and the second function circuit used in executing the second instruction. The power state transition accommodates at least one power attribute selected from a group consisting of: an inrush current value, and an overall power dissipation value.

In various instances of the aforementioned embodiments, the first function circuit is used to execute the first instruction, and the second function circuit is used to execute the second instruction. The first function circuit is associated with a first clock gating circuit operable to gate and un-gate a system clock for the first function circuit, and a first power island operable to deliver power to the first function circuit. The second function circuit is associated with a second clock gating circuit operable to gate and un-gate a system clock for the second function circuit, and a second power island operable to deliver power to the second function circuit. The power attribute includes the overall power dissipation value, and determining a power state transition between the first instruction and the second instruction includes: determining that maintaining both the first function circuit in an operative power state and maintaining the second function circuit in an operative power state exceeds a power dissipation level; selecting a reduced power state for the first function circuit; and selecting an operative power state for the second function circuit.

In some cases, the operative power state for the second function circuit includes applying power to the second power island, and un-gating the system clock for the second function circuit. In various cases, the reduced power state for the first function circuit includes gating the system clock for the first function circuit. In one or more cases, the reduced power state for the first function circuit includes removing power from the first power island. In various cases, the first function circuit includes a first sub-function circuit associated with a first sub-clock gating circuit operable to gate and un-gate the system clock for the first function circuit provided to the first sub-function circuit, and a second sub-function circuit associated with a second sub-clock gating circuit operable to gate and un-gate the system clock for the second function circuit provided to the second sub-function circuit. In such cases, the reduced power state for the first function circuit may include gating the system clock for the first function circuit provided to the first sub-function circuit and un-gating the system clock for the first sub-function circuit provided to the second sub-function circuit. In particular cases, the first power island includes a first sub-power island and a second sub-power island, the first function circuit includes a first sub-function circuit powered by the first sub-power island and a second sub-function circuit powered by a second sub-power island. In such cases, the reduced power state for the first function circuit may include removing power from the first sub-power island and maintaining power to the second sub-power island.

In some instances of the aforementioned embodiments, the first function circuit and the second function circuit are idle during execution of the first instruction. The first instruction circuit and the second instruction circuit are used to execute the second instruction. The first function circuit is associated with a first clock gating circuit operable to gate and un-gate a system clock for the first function circuit, and a first power island operable to deliver power to the first function circuit. The second function circuit is associated with a second clock gating circuit operable to gate and un-gate a system clock for the second function circuit, and a second power island operable to deliver power to the second function circuit. The power attribute includes the inrush current value. In such instances, determining a power state transition between the first instruction and the second instruction may include: determining that transitioning both the first function circuit and the second function circuit to an operative power state at the same time results in a current draw that exceeds and inrush current value; determining that the first function circuit is used before the second function circuit in executing the second instruction; selecting transition of the first function circuit to an operative power state at a first stage corresponding to a first time; and selecting transition of the second function circuit to an operative power state at a second stage corresponding to a second time, wherein the second time occurs after the first time.

In some cases, the first stage includes a third stage at a third time and a fourth stage at a fourth time. The third stage includes applying power to the first power island, and wherein the fourth stage includes un-gating the system clock using the first clock gating circuit. In other cases, the second stage includes a third stage at a third time and a fourth stage at a fourth time. The third stage includes applying power to the second power island, and the fourth stage includes un-gating the system clock using the second clock gating circuit. In yet other cases, the first function circuit includes a first sub-function circuit and a second sub-function circuit. The first stage includes a third stage at a third time and a fourth stage at a fourth time. In such cases, the third stage includes transitioning the power state of the first sub-function circuit to an operative power state, and the fourth stage includes transitioning the power state of the second sub-function circuit to an operative power state.

In one or more instances of the aforementioned embodiments, augmenting the semiconductor design to implement the determined power state transition includes adding logic to the semiconductor design that causes the determined power state transition. In some such cases, the added logic includes a next process scheduler circuit that is operable to schedule the determined power state transition of the first function circuit by the first time and to schedule the power state transition of the second function circuit by the second time.

Yet additional embodiments of the present invention provide computer readable media having instructions executable by a processor to: receive a semiconductor design that includes a first function circuit, and a second function circuit. The instructions are further executable to simulate the semiconductor design using a first instruction and a second instruction. The simulation provides an indication of a first subset of the first function circuit and the second function circuit used in executing the first instruction and a second subset of the first function circuit and the second function circuit used in executing the second instruction. The instructions are further executable to determine a power state transition between the first instruction and the second instruction. The power state transition accommodates at least one power attribute that may be either an inrush current value, or an overall power dissipation value. The semiconductor design is augmented to implement the determined power state transition.

Yet further embodiments of the present invention provide semiconductor design systems. The systems include a microprocessor based machine including a microprocessor, and a computer readable medium communicably coupled to the microprocessor based machine, and having instructions executable by the microprocessor to: receive a semiconductor design that includes a first function circuit, and a second function circuit. The instructions are further executable to simulate the semiconductor design using a first instruction and a second instruction. The simulation provides an indication of a first subset of the first function circuit and the second function circuit used in executing the first instruction and a second subset of the first function circuit and the second function circuit used in executing the second instruction. The instructions are further executable to determine a power state transition between the first instruction and the second instruction. The power state transition accommodates at least one power attribute that may be either an inrush current value, or an overall power dissipation value. The semiconductor design is augmented to implement the determined power state transition.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1:
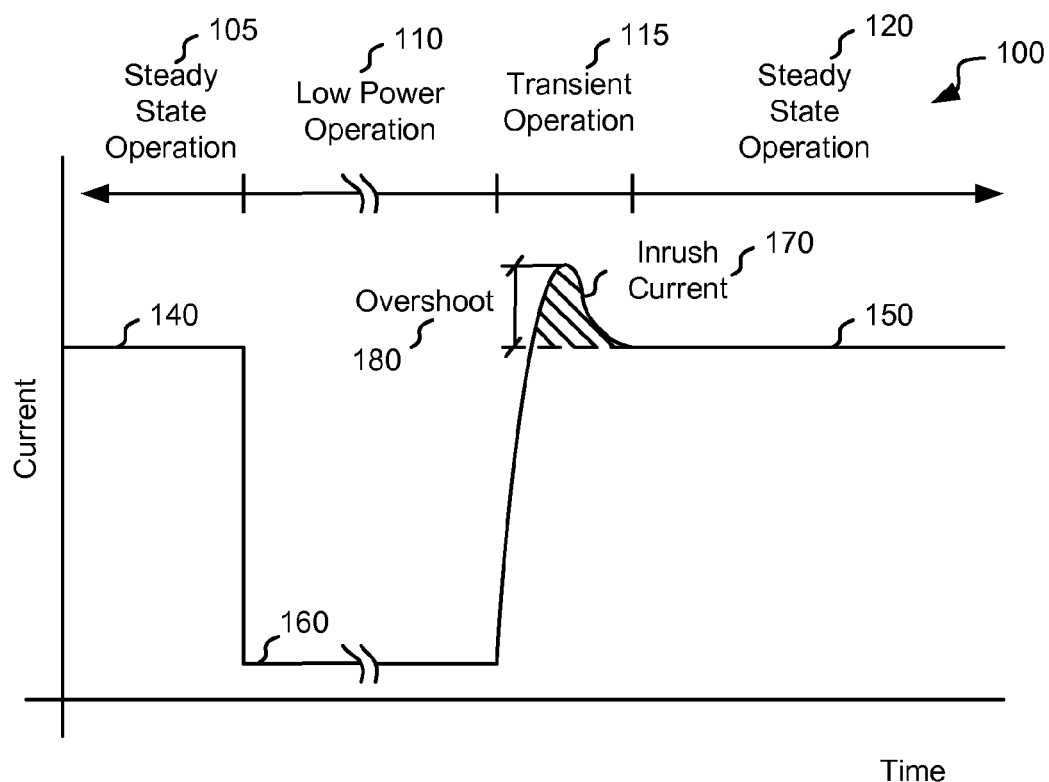
FIG. 1 depicts an inrush current scenario that is possible in various prior art semiconductor devices.

The present inventions are related to systems and methods for controlling power dissipation in a semiconductor device, and more particularly to systems and methods for governing power state transition in a semiconductor device.

Various embodiments of the present invention provide architectural-level control of one or more reduced power states for one or more function circuits. Some embodiments of the present invention optimize for one or more situations, at times in combination, that arise when a power state change occurs in a semiconductor device. Such a power state change may include, but is not limited to, moving a function circuit in a semiconductor device from a reduced power state to an operative power state, or a combination of moving one or more function circuits from a reduced power state to an operative power state in combination with moving one or more other function circuits to reduced power states. As used herein, the term "operative power state" is used in its broadest sense to mean a power state that is sufficiently operable to perform a defined function. As used herein, the term "reduced power state" is used in its broadest sense to mean a power state where the corresponding function is not fully operative. As some examples, such reduced power states may include a power state where a system clock to a function circuit is gated to reduce dynamic power consumption, a power state where a power island associated with a function circuit is not powered, and/or a power state where the power to one or more devices in a function circuit is reverse biased to mitigate leakage current when idle (i.e., by manipulating voltage applied to the bodies of various transistors to reduce and/or eliminate leakage currents by lowering voltage differentials). Based upon the disclosure provided herein, one of ordinary skill in the art will recognize a variety of reduced power states that may be utilized in accordance with different embodiments of the present invention.

Various embodiments of the present invention provide capability to ramp power application to one or more function circuits during a change of power state to reduce or eliminate inrush current. In some cases where two or more function circuits are moving from a reduced power state to an operative power state, the ramping may be accomplished by moving one of the function circuits to the operative power states, followed later by moving another one of the function circuits to the operative power state. By thus staging the application of power to the different function circuits, an impact on the current usage in the semiconductor device is spread over time and inrush current is minimized. As another example, where a power state change calls for moving a single function circuit to an operative power state, sub-function circuits within the function circuit may be sequentially powered up in much the same way described above in relation to multiple function circuits. Alternatively or in addition, the power up process may include sequentially powering up through multiple reduced power states until an operative power state is achieved. For example, a power island associated with the function being moved to an operative power state may be powered while reverse biasing and clock gating is still applied to the function circuit. At some point in the future, the reverse biasing may be removed, and a yet a later point in the future, clock gating may be eliminated rendering the function circuit operatively powered. Again, by sequencing or staging the power state changes, inrush current is reduced or eliminated. Based upon the disclosure provided herein, one of ordinary skill in the art will recognize a variety of sequencing or staging that may be applied to changes from one power state to another to limit inrush current in accordance with different embodiments of the present invention.

Other embodiments of the present invention provide capability to govern overall power dissipation and/or to maintain overall power dissipation within a defined limit. For example, a semiconductor may offer a number of functions that because of power limitations of the device cannot be operatively powered simultaneously. In some cases, whenever a power state change is required, it is determined whether the power state change as called for will result in an overall power dissipation that is within the defined limit. Where it is not, one or more unneeded or less needed function circuits may be moved to a reduced power state as part of the power state change. In some cases, the limit of the overall power dissipation is programmable. This allows for design of a common semiconductor device capable of performing power management tailored for two or more distinct overall power dissipation budgets. In some cases, overall power dissipation control and/or ramped power state changes may be incorporated in the same design.

Yet other embodiments provide semiconductor design tools and/or methods that provide for integrating power state change control in accordance with different embodiments of the present invention. Such tools allow for design-time selection and governance of power state changes such that ramped power state changes limiting inrush current and balanced power state changes governing overall power dissipation may be integrated with a semiconductor design.

Figure 2:
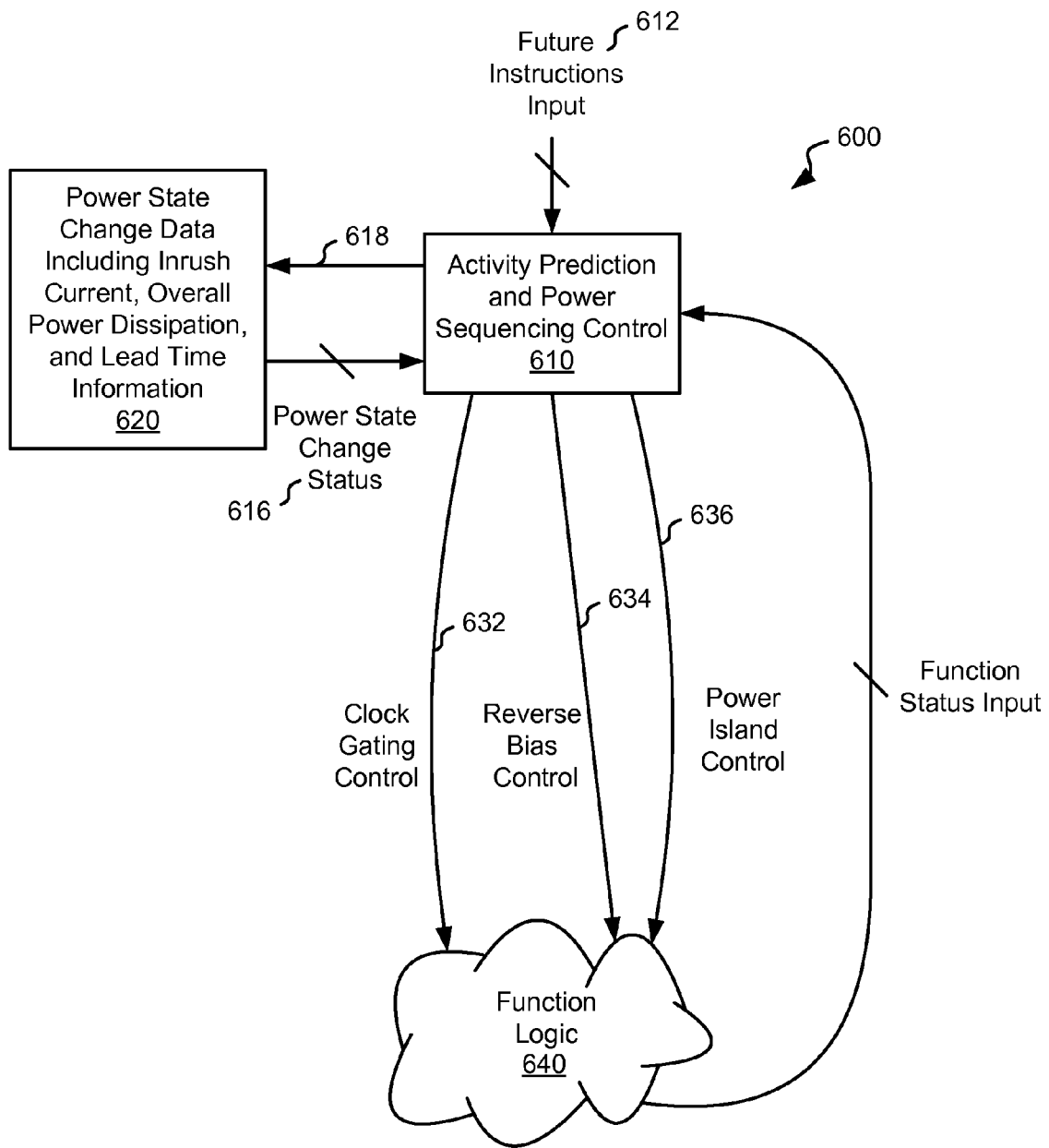
FIG. 2 is a conceptual diagram of a power control circuit capable of tempering power state changes to limit inrush current in a semiconductor device in accordance with some embodiments of the present invention.

Turning to FIG. 2, a conceptual diagram of a power control circuit 600 capable of tempering power state changes to limit inrush current in a semiconductor device is shown in accordance with some embodiments of the present invention. Power control circuit 600 includes an activity prediction and power sequencing control 610 that is responsible for directing any change of power state across a variety of function logic 640 included in the device. Activity prediction and power sequencing control 610 receives a future instruction input 612. Future instruction input 612 indicates one or more instructions that are to be executed in the future. Based on this information, activity prediction and power sequencing control 610 can determined points in the future when certain portions of function logic 640 are to be used, and to predictively determine when to modify the power state of the needed portions of function logic 640 such that the portions are operational at the time they are needed. Once it is determined when in the future that a particular portion of function logic 640 is to be used, the power state of the portion of function logic 640 can begin changing. The power state change may be gradual such that inrush current is limited.

In addition, activity prediction and power sequencing control 610 receives a function status input 642. Function status input 642 identifies the current power state of the various functions (i.e., portions of function logic 640) that are supported along with a status of whether the function has completed a previously requested function or will complete a previously executing function. For example, function status input 642 may indicate that a particular portion of function logic 640 will complete in 'n' clock cycles. This information allows activity prediction and power sequencing control 610 to determine when in the future it will be possible to degrade the power state of the portion.

A data set 620, often maintained in a memory, is accessible to activity prediction and power sequencing control 610. In particular, an access request 618 and a power state change status information 616 is provided in return. This power state change status information indicates the number of clock cycles that it takes to restore power to portions of function logic 642, the change in static power usage of function logic 640 when the power state change is implemented, and the potential inrush current due to the power state change. This information is used by activity prediction and power sequencing control 610 to determine an appropriate power sequencing that will maintain circuit operation within an overall power dissipation budget and within an inrush current budget. Once an acceptable power sequencing is determined, a clock gating control 632, a reverse bias control 634, and a power island control 636 are provided to caused the desired power sequencing to be implemented.

As used herein, the term "instruction" is used in its broadest sense to mean any control information that is used to determine a particular operation of a circuit. This control information may be used either at design-time or at run-time to predict a future power state change in the circuit. Further, as used herein, the process of decoding an instruction or performing an instruction decode is used in its broadest sense to mean any process of deriving an indication of future processing needs based upon an instruction.

For example, an instruction may be a software instruction provided from a source external to the circuit that indicates one or more processes that are to be applied to a particular data element. Decoding the software instruction reveals one or more functions of the circuit that will be need in the future, and the point in time in the future when the particular function(s) will be needed. As such, either at design-time or at run-time, decisions about future power state changes in the circuit can be made allowing for the power state change to be predictively determined to accommodate the received instruction. As an instruction decode may be done many clock cycles before one or more functions will be employed to execute the instruction, predictively determining power state changes based upon the decode information provides an ability to design and/or operate the circuit such that functions are operatively powered just in time to perform the needed operation. This results in power savings by allowing the function to remain in a reduced power state longer, and reduces latency that may otherwise occur if data processing had to be delayed while waiting for a particular function to be transitioned from a reduced power state to an operative power state.

As another example, an instruction may be embedded with data received from a source outside of the circuit. This may occur, for example, where a header including control information is appended to a data packet. Such instructions are handled similar to the previously described software instructions.

As yet another example, an instruction may be an indication of an internal state of the circuit. Thus, as an example, an instruction may comprise one or more feedback signals at an instant in time that are each derived from the various functions within the circuit. Together, these feedback signals may be used to determine which functions will be used in the future and at what point in the future they will be needed. In this case, an instruction decoder may be a state machine or other determinative circuit that is capable of receiving the feedback signals and identifying which circuits will need to assume an operative power state at some point in the future. In particular cases, the instruction may be a single signal provided from one function to another indicating a future completion of operation of the function. In such a case, the instruction decoder may simply be a circuit or connection passing the completion information to the downstream process. In a run-time scenario, the circuit may be designed to initiate defined power state transitions based upon the decoded instruction. In a design time scenario, a designer may know that when one process is being completed in the circuit, and that another process will inevitably follow some number of clock cycles later. In either case, an ability to power up a portion of the circuit just in time to perform a desired function is made possible. Again, this results in power savings by allowing the function to remain in a reduced power state longer, and reduces latency that may otherwise occur if data processing had to be delayed while waiting for a particular function to be transitioned from a reduced power state to an operative power state. As a particular example, where the circuit controls a hard disk drive, the instruction may be a signal from an address decode circuit indicating that a read request has been received. Based upon this, a motor controller responsible for rotating the storage medium and moving a read/write head assembly may be alerted that a read will be taking place in a defined number of clock cycles in the future.

It should be noted that an instruction may include a combination of internal control information and externally provided control information. Thus, for example, an instruction may be a combination of a software instruction and a set of internal feedback signals indicating the status of various functions within the circuit. Based upon the disclosure provided herein, one of ordinary skill in the art will recognize a variety of instructions that may be operated on in accordance with different embodiments of the present invention.

Some embodiments of the present invention include an instruction interface. As used herein, the phrase "instruction interface" is used in its broadest sense to mean any mechanism whereby an instruction is received. As an example, an instruction interface may be an interface whereby a software instruction is received. As another example, an instruction interface may be one or more signal lines along with a defined protocol whereby internal status signals are combined to form an instruction. Thus, as one example, an instruction interface may include four status signals from each function circuit. One of the status signals is asserted whenever the function is operatively powered, another of the status signals is pulsed whenever a function is within ten clock cycles of completing operation, another of the status signals is pulsed whenever a function is within five clock cycles of completing operation, and the other status signal is pulsed whenever operation is completed. This combination of status signals received via the instruction interface can be used to predictively determine a power state transition for the function providing the status signals and other functions in the circuit.

Figure 3:
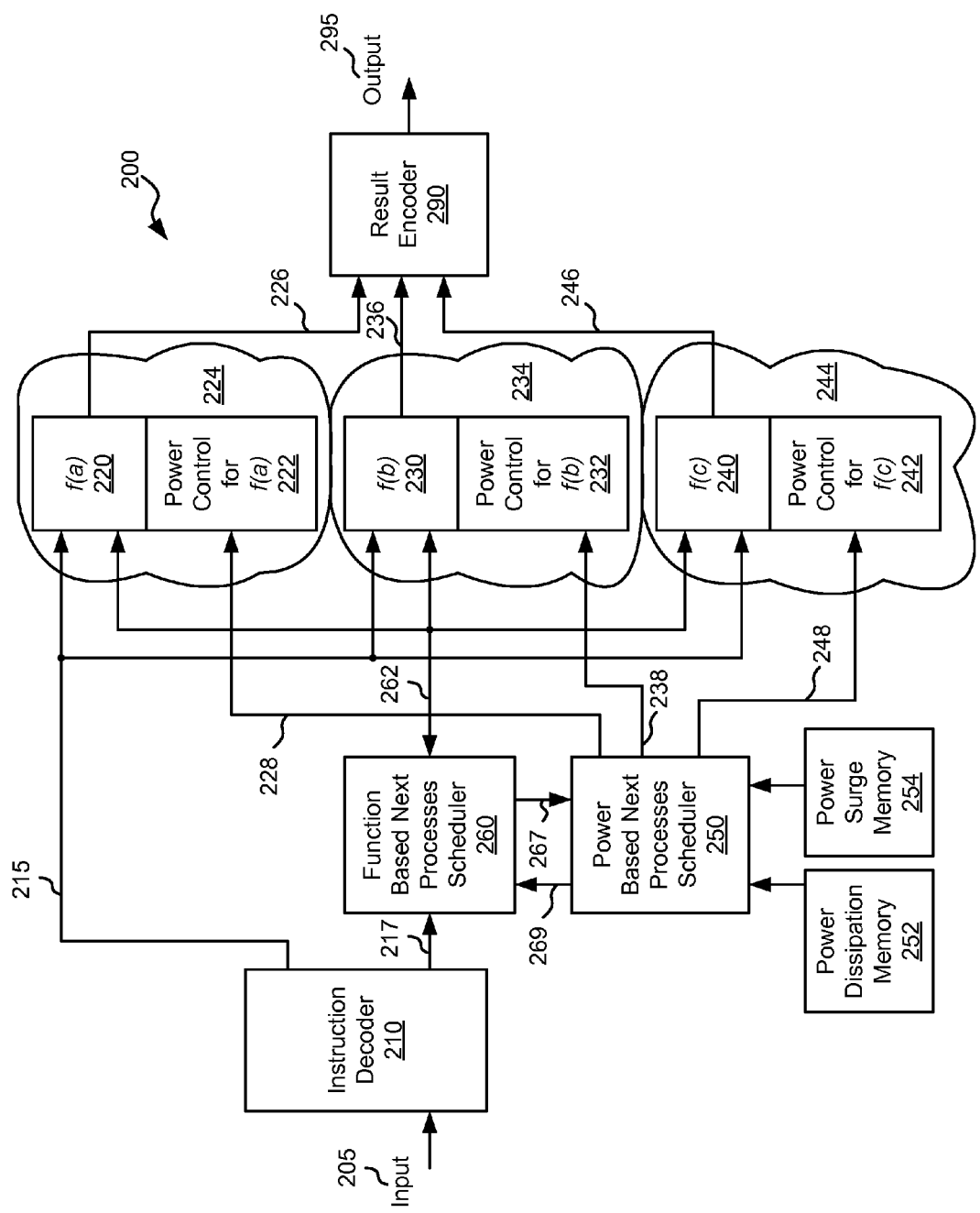
FIG. 3 shows a block diagram of a semiconductor device including overall power dissipation and ramped power control in accordance with various embodiments of the present invention.

Turning to FIG. 3, a block diagram of a semiconductor device 200 including overall power dissipation and ramped power control is shown in accordance with various embodiments of the present invention. Semiconductor device 200 includes a number of functional circuits 220, 230, 240 that are designed to implement functions f(a), f(b) and f(c), respectively. The implemented function may be any function pertaining to one or more processes provided by semiconductor device 200 including, but not limited to, mathematical functions, pipelined processing functions, storage functions, I/O functions, and/or the like. Based upon the disclosure provided herein, one of ordinary skill in the art will recognize a variety of functions that may be implemented as part of semiconductor device 200.

Each functional circuit 220, 230, 240 includes a power control circuit that is integrated with the function, and is powered by one or more power islands. As shown, functional circuit 220 includes a power control circuit 222 integrated with functional circuit 220, and is implemented on a power island 224. Power island 224 may include one or more sub-islands that provide power to different portions of functional circuit 220. Power island 224 provides power to functional circuit 220 and power control circuit 222 based upon a power control input 228 from a power based next processes scheduler circuit 250. Power control circuit 222 implements one or more power control processes applicable to functional circuit 220 including, but not limited to, reverse biasing to mitigate leakage current when idle, clock gating to reduce dynamic power consumption, and/or logical power-down states under software control. Depending upon the desired power scenario, power control circuit 222 applies one or more of the available power control processes to govern power expended by functional circuit 220. Functional circuit 230 includes a power control circuit 232 integrated with functional circuit 230, and is implemented on a power island 234. Power island 234 may include one or more sub-islands that provide power to different portions of functional circuit 230. Power island 234 provides power to functional circuit 230 and power control circuit 232 based upon a power control input 238 from a power based next processes scheduler circuit 250. Power control circuit 232 implements one or more power control processes applicable to functional circuit 230 including, but not limited to, reverse biasing to mitigate leakage current when idle, clock gating to reduce dynamic power consumption, and/or logical power-down states under software control. Depending upon the desired power scenario, power control circuit 232 applies one or more of the available power control processes to govern power expended by functional circuit 230. Functional circuit 240 includes a power control circuit 242 integrated with functional circuit 240, and is implemented on a power island 244. Power island 244 may include one or more sub-islands that provide power to different portions of functional circuit 240. Power island 244 provides power to functional circuit 240 and power control circuit 242 based upon a power control input 248 from a power based next processes scheduler circuit 250. Power control circuit 242 implements one or more power control processes applicable to functional circuit 240 including, but not limited to, reverse biasing to mitigate leakage current when idle, clock gating to reduce dynamic power consumption, and/or logical power-down states under software control. Depending upon the desired power scenario, power control circuit 242 applies one or more of the available power control processes to reduce power expended by functional circuit 240.

Functional circuits 220, 230, 240 each receive a data input 215 from an instruction decoder circuit 210. Instruction decoder circuit 210 receives an input 205, and parses input 205 to determine which of function circuits 220, 230, 240 is/are to be used in processing input 205. As an example, input 205 may be a packet of information including an instruction and data to be operated on. Depending upon the instruction, the data to be operated on is passed as a data input 215 to selected ones of function circuits 220, 230, 240. In some cases, the data may be actual data that is to be operated on or an address or pointer to a location from which the data may be obtained. Thus, for example, where data input 215 is an address of data to be operated on and function circuit 220 is a memory function, the address may be provided to function circuit 220 where it is retrieved. The retrieved data may be passed to, for example, function circuit 230 where a process is applied to the retrieved data, and the processed data provided as an output. Alternatively, the retrieved data may be provided directly as an output. As another example, data input 215 may be provided to two or more of function circuits 220, 230, 240, and each of the receiving functions performs a process on the data consistent with the respective function and provides an output. It should be noted that the aforementioned examples are not exhaustive of all possibilities. Based upon the disclosure provided herein, one of ordinary skill in the art will recognize a variety of instructions that may be processed and/or combinations and/or sequences of function circuits 220, 230, 240 that may be applied to the processing.

Each of function circuits 220, 230, 240 provides an output to a result encoder circuit 290. In particular, function circuit 220 provides an output 226 to result encoder circuit 290; function circuit 230 provides an output 236 to result encoder circuit 290; and function circuit 240 provides an output 246 to result encoder circuit 290. Result encoder circuit 290 combines the received outputs in accordance with the executed instruction and provides an output 295. Result encoder circuit 290 may be any circuit capable of providing output 295 based on one or more inputs, and is designed to implement the particular function(s) of semiconductor device 200.

Power control of function circuits 220, 230, 240 is provided by power based next processes scheduler circuit 250, and operational selection of function circuits 220, 230, 240 is provided by function based next processes scheduler circuit 260. Function based next processes scheduler circuit 260 provides and receives scheduling status of each of function circuits 220, 230, 240 via a status input/output 262. For example, status input/output 262 may be used by function based next processes scheduler circuit 260 to provide an enable to one or more of function circuits 220, 230, 240 to initiate processing by the function, and may be used to provide a status from the different functions indicating that the enabled function has completed or when it will complete (e.g., will complete in five clock cycles). While status input/output 262 and data input 215 are shown as a single shared connection, they may be implemented using a number of routes that are either shared or not.

At the time that the design of semiconductor device 200 is being completed, a variety of information about the design is known. For example, for a given instruction received via instruction decoder circuit 210 it is know which of function circuits 220, 230, 240 are needed to execute the instruction and in which order the functions will be used. As a more particular example, where function circuit 220 is a memory access function, function circuit 230 is a processing function, and a given instruction requires a memory access by function circuit 220 followed by processing of the retrieved data by function circuit 230, it is known at design-time the series of functions that is to be performed whenever the instruction is received. Further, it may be known how many clock cycles the first function will take to complete and how many the subsequent function will take to complete. In addition, it may be known how many clock cycles that it takes for each of functions 220, 230, 240 to return from a given power down state to an operative power state (e.g., number of clock cycles to return from a no power state to an operative power state, number of clock cycles to return from a gated clock state to an operative power state, and/or number of clock cycles required to return from a reverse biased state to an operative power state). Based on this information, the combination of power based next processes scheduler circuit 250 and function based next processes scheduler circuit 260 operate to predictively modify the power state of function circuits 220, 230, 240 in a staged fashion that assures that overall power dissipation is maintained within desired limits and that any inrush current is maintained within an acceptable level, and to enable operation of function circuits 220, 230, 240 to perform processes consistent with a received instruction. It should be noted that while semiconductor device 200 provides for governing both overall power dissipation and inrush current, that other embodiments of the present invention may be implemented to control only inrush current levels or overall power dissipation levels.

In operation, function based next processes scheduler circuit 260 is made aware of future instructions by instruction decoder circuit 210. This may be done, for example, by providing a future instruction input 217 from instruction decoder circuit 210 as soon as instruction decoder circuit 210 has identified an instruction in input 205. Function based next processes scheduler circuit 260 includes logic or memory indicating which of function circuits 220, 230, 240 and any sequence thereof that are to be used in executing the particular function. As instruction decoder circuit 210 may have a relatively long pipeline, instruction input 217 may be received a number of clock cycles before the instruction is provided to function circuits 220, 230, 240 for processing. Based upon this knowledge of upcoming instructions, the current power state of function circuits 220, 230, 240, and the time required to modify current power state to a power state applicable to the particular instruction, function based next processes scheduler circuit 260 identifies the functions that will be needed to process the upcoming instructions and at what time the different functions will be needed. Based upon this information, function based next processes scheduler circuit 260 prepares enables to be provided to the selected functions as status input/output 262. This is a preliminary scheduling of function circuits 220, 230, 240 subject to modification by power based next processes scheduler circuit 250 as described below. Any modification is made in accordance with a feedback control 269 received from power based next processes scheduler circuit 250.

In addition, function based next processes scheduler circuit 260 provides an updated power requirement output 267 to power based next processes scheduler circuit 250. Power based next processes scheduler circuit 250 determines the sequence of changing power states of function circuits 220, 230, 240 based upon the current power state of all functions in semiconductor device 200 and future power state requirements indicated by updated power requirement output 267. For example, where the received instruction will require powering on power island 224 and power island 226, power based next processes scheduler circuit 250 may first select to merely gate the clock to function circuit 240. Power based next processes scheduler circuit 250 determines whether the aforementioned power state change can be done all at once while maintaining an acceptable level of inrush current, and whether overall power dissipation levels would be acceptable where the power change called for by updated power requirement output 267 is implemented all at once. This is done by accessing a table of power dissipation values from a power dissipation memory 252, and a table of power surge values from a power surge memory 254. In particular, updated power requirement output 267 and selected power states for other function circuits is used to select or generate an address that is included in both power dissipation memory 252 and power surge memory 254. The address corresponds to the combination of power states of all functions in semiconductor device 200 called for by updated power requirement output 267 (e.g., powering on power island 224 and power island 226, and gating the clock to function circuit 240). In some cases, data from power dissipation memory 252 and power surge memory 254 is further indexed using voltage and/or temperature information. In such cases, the voltage and/or temperature information may be incorporated with the combination of power states of all functions to derive an index.

Where the value returned from power dissipation memory 252 is within a defined power dissipation level, the overall power dissipation test passes. In some embodiments of the present invention, the allowable power dissipation level is programmable. Alternatively, where the value returned from power dissipation memory 252 is greater than the defined power dissipation level, a power dissipation error is flagged. In response to a flagged error, power based next processes scheduler circuit 250 selects one or more currently unused functions to be placed in a further reduced power state. Using the current example, function circuit 240 may be moved from a gated clock power state to a power state where power island 244 is powered down. This new power state is combined with updated power requirement output 267 to select or generate an address that is included in both power dissipation memory 252 and power surge memory 254 (e.g., an address corresponding to powering on power island 224 and power island 226, and gating the clock to function circuit 240). This process of checking for an acceptable power dissipation using power dissipation memory 252 may be repeated until an acceptable combination of power states for function circuits 220, 230, 240 is identified. Power requirements and functional scenarios are known at design time, and can be used by a design tool to assure that at least one acceptable combination of power controls will achieve the desired power dissipation level. Further, the knowledge of power requirements can be used to program values in both power dissipation memory 252 and power surge memory 254. In some cases, the various values maintained in power dissipation memory 252 and power surge memory 254 may be programmed at design time, or may be programmed after the device is manufactured. In one particular case, the various values maintained in power dissipation memory 252 and power surge memory 254 are adaptively updated during operation of the device depending upon various feedback signals provided to the device.

Once a combination of power states is identified that will allow for processing the upcoming instruction within the overall power dissipation limits, the address corresponding to the combination of power states is used to access power surge memory 254. An inrush current value that is expected when changing from the current power state to the previously identified power state is accessed from the address location in power surge memory 254. This inrush current value is compared with an allowable inrush current level. In some embodiments of the present invention, the allowable inrush current level is programmable.

Where the value returned from power surge memory 254 is lower than the allowable inrush current level, the inrush current test passes. Alternatively, where the value returned from power surge memory 254 is greater than the allowable inrush current level, an inrush current error is flagged. In response to the flagged error, power based next processes scheduler circuit 250 selects a sequence of power state changes based upon information provided by updated power requirement output 267. For example, the instruction to be executed may require function circuit 220 initially, and only after completion of function circuit 220 is function circuit 230 required. In such a case, power may be applied initially to function circuit 220 followed later by application of power to function circuit 230.

Figure 4:
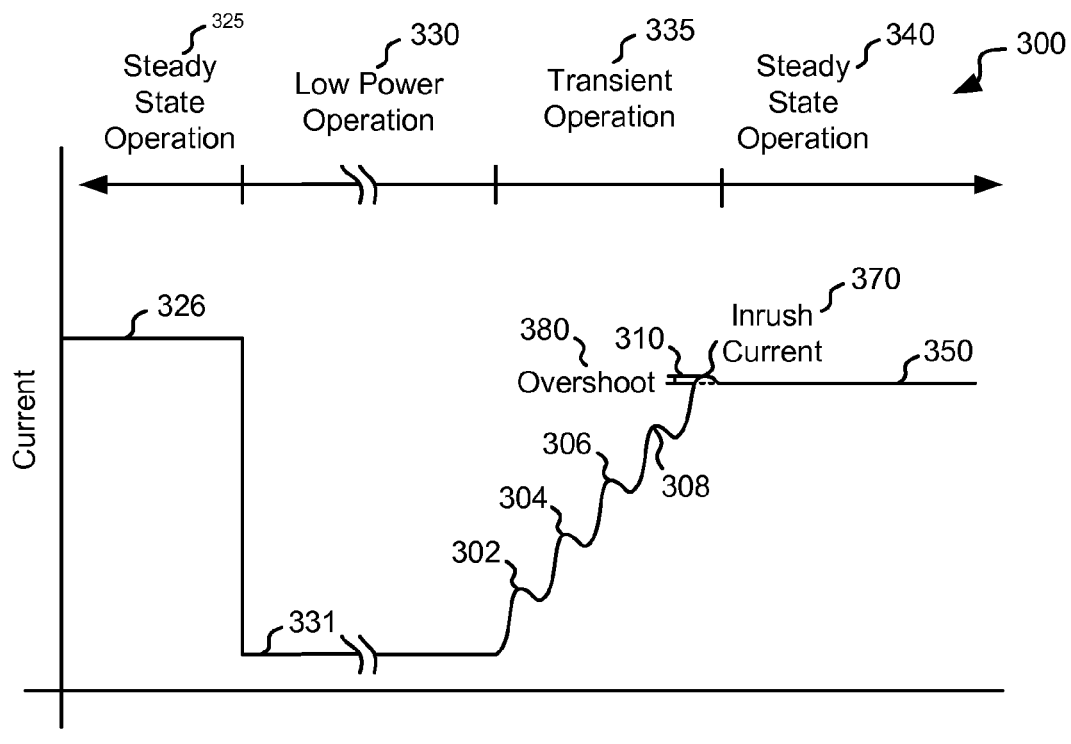
FIG. 4 depicts an exemplary reduced inrush current achieved by staggering or ramping power state changes in accordance with different embodiments of the present invention.

Such staggering of sub-elements of the power state change results in a reduction of the actual inrush current as depicted in a timing diagram 300 of FIG. 4. During an initial steady state operational period 325, current at a level 326 is consumed. At a point, power to the circuit is reduced for operation during a low power operational period 330. During low power operational period 330, current at a relatively low level 331 is consumed. Once the circuit is again needed, current is increased to the circuit during a transient operational period 335. During transient operational period 335, current to the circuit increases from level 331 to level 350. In particular, current increases through five increases in power (i.e., stages) 302, 304, 306, 308, 310 resulting in a ramped power increase form level 331 to level 350. Each power increase induces an inrush current that is relatively small when compared with the inrush current that would be expected if the power increase was not staged. As an example, increases 302, 304, 306, 308, 310 may correspond to applying power to power islands 224, 234, 244, un-gating a clock to functional circuits 220, 230, 240, and/or reverse biasing functional circuits 220, 230, 240 to mitigate leakage current when idle. As shown, by staging or ramping the power state change, the current is ramped over time resulting in an overshoot 380 and corresponding inrush current 370 when compared to an un-staged power state change. Eventually, the level returns to level 350 associated with a steady state operational period 340. In some cases, the staging can be adjusted such that inrush current 370 is either zero or close to zero. While FIG. 4 shows an inrush current as being affected by a sudden increase in current, various embodiments of the present invention may be used to spread sudden decreases in current as well. As such, inrush current may include overshoot similar to that shown in FIG. 4, and may include undershoot caused by a rapid decrease in current needs.

Once the combination of power states and the sequence of power states satisfying the allowed inrush current and the allowed power dissipation is identified, the determined power state change is implemented by power based next processes scheduler circuit 250 asserting power control inputs to the various functions (i.e., power control input 228, power control input 238, power control input 248). The power control inputs are asserted to assure that each of function circuits 220, 230, 240 are moved the desired next power state in time for the desired function to operate on an incoming instruction. Thus, for example, where a given instruction is to be executed ten clock cycles after it is originally identified to function based next processes scheduler circuit 260 via future instruction input 217 and it takes three clock cycles to move the first needed function to an operative power state, the power control output 228 initiates the change in power state to the function at issue three clock cycles before the function is to be used. As another example, where function circuit 220 is to be used first followed by function circuit 230 and both require three clock cycles to move from a defined power state to an operative power state, function circuit 220 may be turned on three clock cycles before it is to be used and function circuit 230 may be turned on three clock cycles before function circuit 220 completes. It should be noted that the aforementioned number of clock cycles to reactivate a function and the sequence of functions is merely exemplary, and based upon the disclosure provided herein, one of ordinary skill in the art will recognize that the number of clock cycles required to reactivate a function depends upon the power state that the function is currently in and the design of the function. Any number of clock cycles to reactivate a function can be accommodated using different embodiments of the present invention. Further, a variety of different function sequences can be accommodated depending upon the particular design parameters.

In addition, power based next processes scheduler circuit 250 reports the determined power state change sequence back to function based next processes scheduler circuit 260 as feedback control 269. Feedback control 269 identifies the point in time when each function will be in an operative power state. Function based next processes scheduler circuit 260 can use this information to modify the preliminarily scheduled assertion time for any enables provided via input/output 262. This predictive approach using early decoded instructions to structure power state changes operates to assure that functions are in an operative power state before the predicted time that the function is to be used. At the same time, it allows the function to be maintained in a low power state until the predicted time that the function is to be used.

In some cases, semiconductor device 200 may be a networking device that receives packets of data as input 205, parses the packets of data in instruction decoder circuit 210, performs one or more functions on the packets of data using one or more of function circuits 220, 230, 240, and provides a data output from a result encoder 290. Based upon the disclosure provided herein, one of ordinary skill in the art will recognize other devices that may be implemented consistent with semiconductor device 200. Further, based upon the disclosure provided herein, one of ordinary skill in the art will recognize a variety of circuit implementations that may utilize ramped power control technology similar to that described in relation to FIG. 3. In the networking device example, it may be that each of function circuits 220, 230, 240 implement computationally intensive functions that are not all used at the same time. As an example, in some cases, one or two of function circuits 220, 230, 240 may be used at the same time, but never all three. In such cases, semiconductor device may be implemented to operate within an overall power dissipation level that is substantially below that required to operate all three of function circuits 220, 230, 240 simultaneously. Further, inrush current can be controlled by a staged power state change when a switch in the needed functions is detected. Because of this ability to predictively control overall power dissipation and/or inrush current, the design margin for semiconductor device 200 would not be bloated and the power wires/rails and/or circuits would not have to be over-designed for the task. This results in an overall power and cost savings.

Based upon the disclosure provided herein, one of ordinary skill in the art will appreciate a variety of advantages that can be achieved through use of one or more embodiments of the present invention. As one example, various embodiments of the present invention may be applied as an effective approach for power management in semiconductor devices. The processes and techniques discussed herein may be incorporated in EDA tools allowing for integration of the disclosed power management techniques with functional designs to reduce design cycle. As another example, various embodiments of the present invention provide an ability to capture power down opportunities that are not known to a particular function or at a control software level. As yet another example, some embodiments of the present invention provide a means for controlling the power-up sequence to govern the inrush current and/or overshoot. Again, based upon the disclosure provided herein, one of ordinary skill in the art will appreciate a variety of other advantages that can be achieved through use of one or more embodiments of the present invention.

Figure 5:
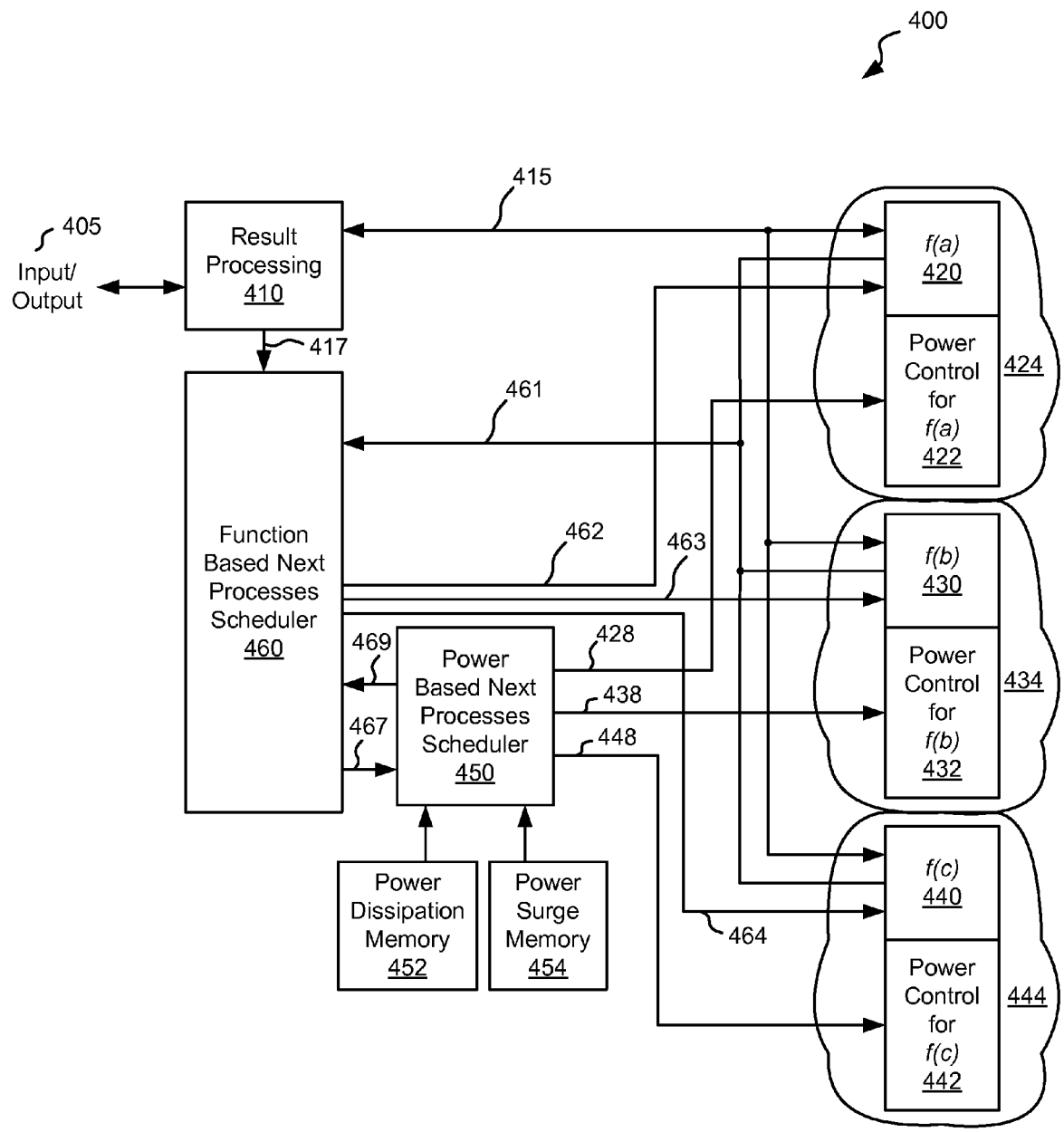
FIG. 5 shows a block diagram of another semiconductor device including overall power dissipation and ramped power control in accordance with various embodiments of the present invention.

Turning to FIG. 5, a block diagram of another semiconductor device 400 including overall power dissipation and ramped power control is shown in accordance with various embodiments of the present invention. Semiconductor device 400 includes a number of functional circuits 420, 430, 440 that are designed to implement functions f(a), f(b) and f(c), respectively. The implemented function may be any function pertaining to one or more processes provided by semiconductor device 400 including, but not limited to, mathematical functions, pipelined processing functions, storage functions, I/O functions, and/or the like. Based upon the disclosure provided herein, one of ordinary skill in the art will recognize a variety of functions that may be implemented as part of semiconductor device 400.

Each functional circuit includes a power control circuit that is integrated with the function, and is powered by one or more power islands. As shown, functional circuit 420 includes a power control circuit 422 integrated with functional circuit 420, and is implemented on a power island 424. Power island 424 may include one or more sub-islands that provide power to different portions of functional circuit 420. Power island 424 provides power to functional circuit 420 and power control circuit 422 based upon a power control input 428 from a power based next processes scheduler circuit 450. Power control circuit 422 implements one or more power control processes applicable to functional circuit 420 including, but not limited to, reverse biasing to mitigate leakage current when idle, clock gating to reduce dynamic power consumption, and/or logical power-down states under software control. Depending upon the desired power scenario, power control circuit 422 applies one or more of the available power control processes to govern power expended by functional circuit 420. Functional circuit 430 includes a power control circuit 432 integrated with functional circuit 430, and is implemented on a power island 434. Power island 434 may include one or more sub-islands that provide power to different portions of functional circuit 430. Power island 434 provides power to functional circuit 430 and power control circuit 432 based upon a power control input 438 from a power based next processes scheduler circuit 450. Power control circuit 432 implements one or more power control processes applicable to functional circuit 430 including, but not limited to, reverse biasing to mitigate leakage current when idle, clock gating to reduce dynamic power consumption, and/or logical power-down states under software control. Depending upon the desired power scenario, power control circuit 432 applies one or more of the available power control processes to govern power expended by functional circuit 430. Functional circuit 440 includes a power control circuit 442 integrated with functional circuit 440, and is implemented on a power island 444. Power island 444 may include one or more sub-islands that provide power to different portions of functional circuit 440. Power island 444 provides power to functional circuit 440 and power control circuit 442 based upon a power control input 448 from a power based next processes scheduler circuit 450. Power control circuit 442 implements one or more power control processes applicable to functional circuit 440 including, but not limited to, reverse biasing to mitigate leakage current when idle, clock gating to reduce dynamic power consumption, and/or logical power-down states under software control. Depending upon the desired power scenario, power control circuit 442 applies one or more of the available power control processes to reduce power expended by functional circuit 440.

Functional circuits 420, 430, 440 are each electrically coupled to a data input/output 415. Data input/output 415 provides data from function circuits 420, 430, 440 to a result processing circuit 410, and provides data from result processing circuit 410 to function circuits 420, 430, 440. Result processing circuit 410 may be any circuit capable of identifying and parsing received instructions and/or data. Data input/output 415 may be implemented as a single shared bus, as a plurality of shared busses, or as a number of direct connected signals lines depending upon the particular circuit implementation. Result processing circuit 410 receives an input via an input/output bus 405, and parses the input to determine which of function circuits 420, 430, 440 is/are to be used in processing the input. As an example, the input may be a packet of information including an instruction and data to be operated on. Depending upon the instruction, the data to be operated on is passed as a data input via data input/output 415 to selected ones of function circuits 420, 430, 440. In some cases, the data may be actual data that is to be operated on or an address or pointer to a location from which the data may be obtained. Thus, for example, where the data input is an address of data to be operated on and function circuit 420 is a memory function, the address may be provided to function circuit 420 where it is retrieved. The retrieved data may be passed to, for example, function circuit 430 where a process is applied to the retrieved data, and the processed data provided as an output. Alternatively, the retrieved data may be provided directly as an output. As another example, the data input may be provided to two or more of function circuits 420, 430, 440, and each of the receiving functions performs a process on the data consistent with the respective function and provides an output. It should be noted that the aforementioned examples are not exhaustive of all possibilities. Based upon the disclosure provided herein, one of ordinary skill in the art will recognize a variety of instructions that may be processed and/or combinations of function circuits 420, 430, 440 that may be applied to the processing.

Each of function circuits 420, 430, 440 provides an output to result processing circuit 410 and/or to other of function circuits 420, 430, 440 via data input/output 415. Result processing circuit 410 combines the received outputs in accordance with the executed instruction and provides an output via input/output bus 405. Result encoder circuit 410 may be any circuit capable of providing an output based on one or more inputs, and is designed to implement the particular function(s) of semiconductor device 400.

Power control of function circuits 420, 430, 440 is provided by power based next processes scheduler circuit 450, and operational selection of function circuits 420, 430, 440 is provided by function based next processes scheduler circuit 460. Function based next processes scheduler circuit 460 provides and receives scheduling status of each of function circuits 420, 430, 440 via a status input 461, and status outputs 462, 463, 464. For example, status output 462 may be used by function based next processes scheduler circuit 460 to provide an enable to function circuit 420 to initiate processing by the function, status output 463 may be used by function based next processes scheduler circuit 460 to provide an enable to function circuit 430 to initiate processing by the function, and status output 464 may be used by function based next processes scheduler circuit 460 to provide an enable to function circuit 440 to initiate processing by the function. Status input 461 may be used by function circuits 420, 430, 440 to indicate completion of the function or when the function will complete (e.g., will complete in five clock cycles). While status input 461 is shown as a single shared connection, it may be implemented using a number of routes that are either shared or not. Further, while status outputs are shown as individual connections, a single shared connection may be used in its place.

At the time that the design of semiconductor device 400 is being completed, a variety of information about the design is known. For example, for a given instruction received via input/output bus 405 and result processing circuit 410 it is know which of function circuits 420, 430, 440 are needed to execute the instruction and in which order the functions will be used. As a more particular example, where function circuit 420 is a memory access function, function circuit 430 is a processing function, and a given instruction requires a memory access by function circuit 420 followed by processing of the retrieved data by function circuit 430, it is known at design-time the series of functions that is to be performed whenever the instruction is received. Further, it may be known how many clock cycles the first function will take to complete and how many the subsequent function will take to complete. In addition, it may be known how many clock cycles that it takes for each of functions 420, 430, 440 to return from a given power down state to an operative power state (e.g., number of clock cycles to return from a no power state to an operative power state, number of clock cycles to return from a gated clock state to an operative power state, and/or number of clock cycles required to return from a reverse biased state to an operative power state). Based on this information, the combination of power based next processes scheduler circuit 450 and function based next processes scheduler circuit 460 operate to predictively modify the power state of function circuits 420, 430, 440 in a staged fashion that assures that overall power dissipation is maintained within desired limits and that any inrush current is maintained within an acceptable level, and to enable operation of function circuits 420, 430, 440 to perform processes consistent with a received instruction. It should be noted that while semiconductor device 400 provides for governing both overall power dissipation and inrush current, that other embodiments of the present invention may be implemented to control only inrush current levels or overall power dissipation levels.

In operation, function based next processes scheduler circuit 460 is made aware of future instructions by result processing circuit 410. This may be done, for example, by providing a future instruction input 417 from result processing circuit 410 as soon as result processing circuit 410 has identified an instruction on input/output bus 405. Function based next processes scheduler circuit 460 includes logic or memory indicating which of function circuits 420, 430, 440 and any sequence thereof that are to be used in executing the particular function. As result processing circuit 410 may have a relatively long pipeline, instruction input 417 may be received a number of clock cycles before the instruction is provided to function circuits 420, 430, 440 for processing. Based upon this knowledge of upcoming instructions, the current power state of function circuits 420, 430, 440, and the time required to modify current power state to a power state applicable to the particular instruction, function based next processes scheduler circuit 460 identifies the functions that will be needed to process the upcoming instructions and at what time the different functions will be needed. Based upon this information, function based next processes scheduler circuit 460 prepares enables to be provided to the selected functions as status output 462, status output 463, and/or status output 464. This is a preliminary scheduling of function circuits 420, 430, 440 subject to modification by power based next processes scheduler circuit 450 as described below. Any modification is made in accordance with a feedback control 469 received from power based next processes scheduler circuit 450.

In addition, function based next processes scheduler circuit 460 provides an updated power requirement output 467 to power based next processes scheduler circuit 450. Power based next processes scheduler circuit 450 determines the sequence of changing power states of function circuits 420, 430, 440 based upon the current power state of all functions in semiconductor device 400 and future power state requirements indicated by updated power requirement output 467. For example, where the received instruction will require powering on power island 424 and power island 226, power based next processes scheduler circuit 450 may first select to merely gate the clock to function circuit 440. Power based next processes scheduler circuit 450 determines whether the aforementioned power state change can be done all at once while maintaining an acceptable level of inrush current, and whether overall power dissipation levels would be acceptable where the power change called for by updated power requirement output 467 is implemented all at once. This is done by accessing a table of power dissipation values from a power dissipation memory 452, and a table of power surge values from a power surge memory 454. In particular, updated power requirement output 467 and selected power states for other function circuits is used to select or generate an address that is included in both power dissipation memory 452 and power surge memory 454. The address corresponds to the combination of power states of all functions in semiconductor device 400 called for by updated power requirement output 467 (e.g., powering on power island 424 and power island 226, and gating the clock to function circuit 440). In some cases, data from power dissipation memory 452 and power surge memory 454 is further indexed using voltage and/or temperature information. In such cases, the voltage and/or temperature information may be incorporated with the combination of power states of all functions to derive an index.

Where the value returned from power dissipation memory 452 is within a defined power dissipation level, the overall power dissipation test passes. In some embodiments of the present invention, the allowable power dissipation level is programmable. Alternatively, where the value returned from power dissipation memory 452 is greater than the defined power dissipation level, a power dissipation error is flagged. In response to a flagged error, power based next processes scheduler circuit 450 selects one or more currently unused functions to be placed in a further reduced power state. Using the current example, function circuit 440 may be moved from a gated clock power state to a power state where power island 444 is powered down. This new power state is combined with updated power requirement output 467 to select or generate an address that is included in both power dissipation memory 452 and power surge memory 454 (e.g., an address corresponding to powering on power island 424 and power island 226, and gating the clock to function circuit 440). This process of checking for an acceptable power dissipation using power dissipation memory 452 may be repeated until an acceptable combination of power states for function circuits 420, 430, 440 is identified. Power requirements and functional scenarios are known at design time, and can be used by a design tool to assure that at least one acceptable combination of power controls will achieve the desired power dissipation level. Further, the knowledge of power requirements can be used to program values in both power dissipation memory 452 and power surge memory 454. In some cases, the various values maintained in power dissipation memory 452 and power surge memory 454 may be programmed at design time, or may be programmed after the device is manufactured. In one particular case, the various values maintained in power dissipation memory 452 and power surge memory 454 are adaptively updated during operation of the device depending upon various feedback signals provided to the device.

Once a combination of power states is identified that will allow for processing the upcoming instruction within the overall power dissipation limits, the address corresponding to the combination of power states is used to access power surge memory 454. An inrush current value that is expected when changing from the current power state to the previously identified power state is accessed from the address location in power surge memory 454. This inrush current value is compared with an allowable inrush current level. In some embodiments of the present invention, the allowable inrush current level is programmable.

Where the value returned from power surge memory 454 is lower than the allowable inrush current level, the inrush current test passes. Alternatively, where the value returned from power surge memory 454 is greater than the allowable inrush current level, an inrush current error is flagged. In response to the flagged error, power based next processes scheduler circuit 450 selects a sequence of power state changes based upon information provided by updated power requirement output 467. For example, the instruction to be executed may require function circuit 420 initially, and only after completion of function circuit 420 is function circuit 430 required. In such a case, power may be applied initially to function circuit 420 followed later by application of power to function circuit 430. Such staggering of sub-elements of the power state change results in a reduction of the actual inrush current as was discussed above in relation to FIG. 4.

Once the combination of power states and the sequence of power states satisfying the allowed inrush current and the allowed power dissipation is identified, the determined power state change is implemented by power based next processes scheduler circuit 450 asserting power control inputs to the various functions (i.e., power control input 428, power control input 438, power control input 448). The power control inputs are asserted to assure that each of function circuits 420, 430, 440 are moved the desired next power state in time for the desired function to operate on an incoming instruction. Thus, for example, where a given instruction is to be executed ten clock cycles after it is originally identified to function based next processes scheduler circuit 460 via future instruction input 417 and it takes three clock cycles to move the first needed function to an operative power state, the power control output 428 initiates the change in power state to the function at issue three clock cycles before the function is to be used. As another example, where function circuit 420 is to be used first followed by function circuit 430 and both require three clock cycles to move from a defined power state to an operative power state, function circuit 420 may be turned on three clock cycles before it is to be used and function circuit 430 may be turned on three clock cycles before function circuit 420 completes. It should be noted that the aforementioned number of clock cycles to reactivate a function and the sequence of functions is merely exemplary, and based upon the disclosure provided herein, one of ordinary skill in the art will recognize that the number of clock cycles required to reactivate a function depends upon the power state that the function is currently in and the design of the function. Any number of clock cycles to reactivate a function can be accommodated using different embodiments of the present invention. Further, a variety of different function sequences can be accommodated depending upon the particular design parameters.

In addition, power based next processes scheduler circuit 450 reports the determined power state change sequence back to function based next processes scheduler circuit 460 as feedback control 269. Feedback control 269 identifies the point in time when each function will be in an operative power state. Function based next processes scheduler circuit 460 can use this information to modify the preliminarily scheduled enables to be provided via status output 462, status output 463, and/or status output 464. This predictive approach using early decoded instructions to structure power state changes operates to assure that functions are in an operative power state before the predicted time that the function is to be used. At the same time, it allows the function to be maintained in a low power state until the predicted time that the function is to be used.

In some cases, semiconductor device 400 may be a hard disk drive controller circuit, with each of functions 420, 430, 440 performing a function germane to controlling the positioning of a storage medium in relation to a read/write head assembly, and/or for providing read data processing and write data processing. In such a case, the received input via input/output bus 405 may be storage medium read or write requests as are known in the art. It should be noted that based upon the disclosure provided herein, one of ordinary skill in the art will recognize a variety of circuit implementations that may utilize ramped power control technology and/or overall power dissipation control technology similar to that described in relation to FIG. 5.

Figure 6:
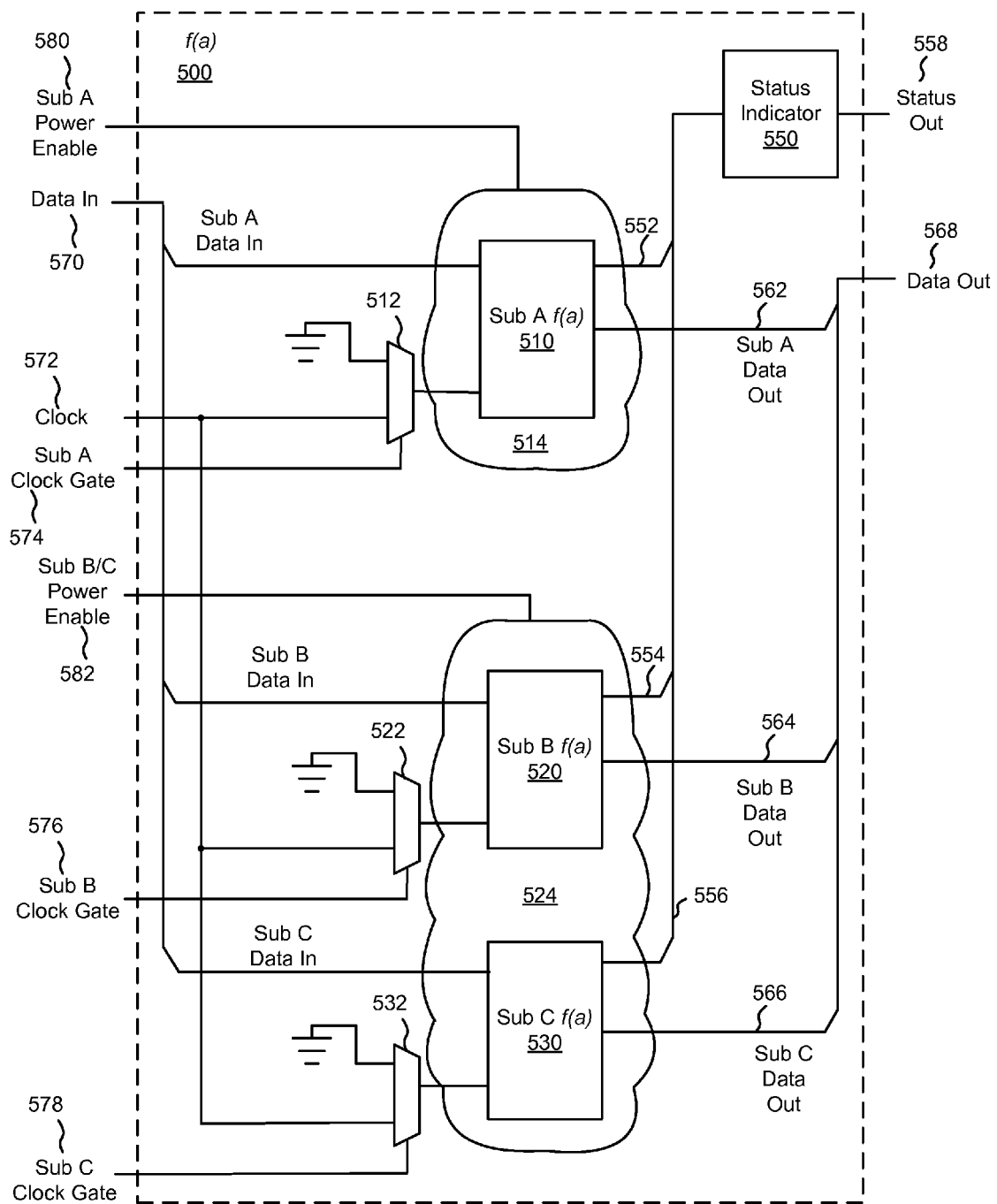
FIG. 6 shows a block diagram of a function circuit including sub-function circuits to which power control in accordance with different embodiments of the present invention may be applied.

Turning to FIG. 6, a block diagram of a function circuit 500 including sub-function control is shown in accordance with one or more embodiments of the present invention. Function circuit 500 performs a function f(x) and may be used in place of any of function circuits 220, 230, 240, 420, 430, 440 described above. Function circuit 500 receives a data input 570 and a clock input 572 that are distributed to each of the sub-function circuits 510, 520, 530. In addition, function circuit 500 receives a Sub A clock gate signal 574 that is operable to gate clock input 572 to sub-function circuit 510 using a multiplexer 512, a Sub B clock gate signal 576 that is operable to gate clock input 572 to sub-function circuit 520 using a multiplexer 522, and a Sub C clock gate signal 578 that is operable to gate clock input 572 to sub-function circuit 530 using a multiplexer 532. In addition, function circuit 500 receives a Sub A power enable input 580 that controls power to a power island 514, and a Sub B/C power enable input 582 that controls power to a power island 524. Power island 514 provides power to sub-function circuit 510 and power island 524 provides power to sub-function circuit 520 and sub-function circuit 530.

Function circuit 500 includes three sub-function circuits 510, 520, 530. Sub-function circuit 510 performs a function Sub A f(x), sub-function circuit 520 performs a function Sub B f(x), and sub-function circuit 520 performs a function Sub C f(x). Sub-function circuit 510 provides a data output 562 and a status output 552, sub-function circuit 520 provides a data output 564 and a status output 554, and sub-function circuit 530 provides a data output 566 and a status output 556. Status output 552, status output 554, and status output 556 are provided to a status indicator circuit 550 that is responsible for reporting the overall and sub-status of function circuit 500. As such, status indicator circuit 550 provides a status output 558. Data output 562, data output 564 and data output 566 are combined and provided as a data output 568.

As an example, where sub-function circuit 500 is used in place of function circuit 220, data input 570 is connected to data input 215. Sub A clock gate signal 574 and sub A power enable signal 580 are provided by power control input 228; and sub B clock gate signal 576, sub C clock gate signal 578 and sub B/C power enable signal 582 are provided by a combination of power control input 238 and power control input 248. Status output 558 is provided as status input/output 262. Data output 568 is provided as output 226. As another example, where sub-function circuit 500 is used in place of function circuit 420, data input 570 and data output 568 are connected to data input 215. Sub A clock gate signal 574 and sub A power enable signal 580 are provided by power control input 462; and sub B clock gate signal 576, sub C clock gate signal 578 and sub B/C power enable signal 582 are provided by a combination of power control input 463 and power control input 464. Status output 558 is provided as status input 461.

In operation, power to sub-function circuit 510 and the combination of sub-function circuit 520 and sub-function circuit 530 can be individually controlled. Further clock gating may be individually applied to each of sub-function circuits 510, 520, 530. As such, power dissipation and/or inrush current can be control at a sub-function level. Thus, where power control was described at the function level in relation to FIGS. 2 and 4 above, it can be extended to a sub-function level through use of a sub-function circuit similar to that described in relation to FIG. 6. It should be noted that function circuit 500 is exemplary of many different function circuits including one or more sub-function circuits that may have power control individually applied. Based upon the disclosure provided herein, one of ordinary skill in the art will recognize a variety of different combinations of sub-function circuits and corresponding power controls that may be applied in accordance with different embodiments of the present invention.

Figure 7:
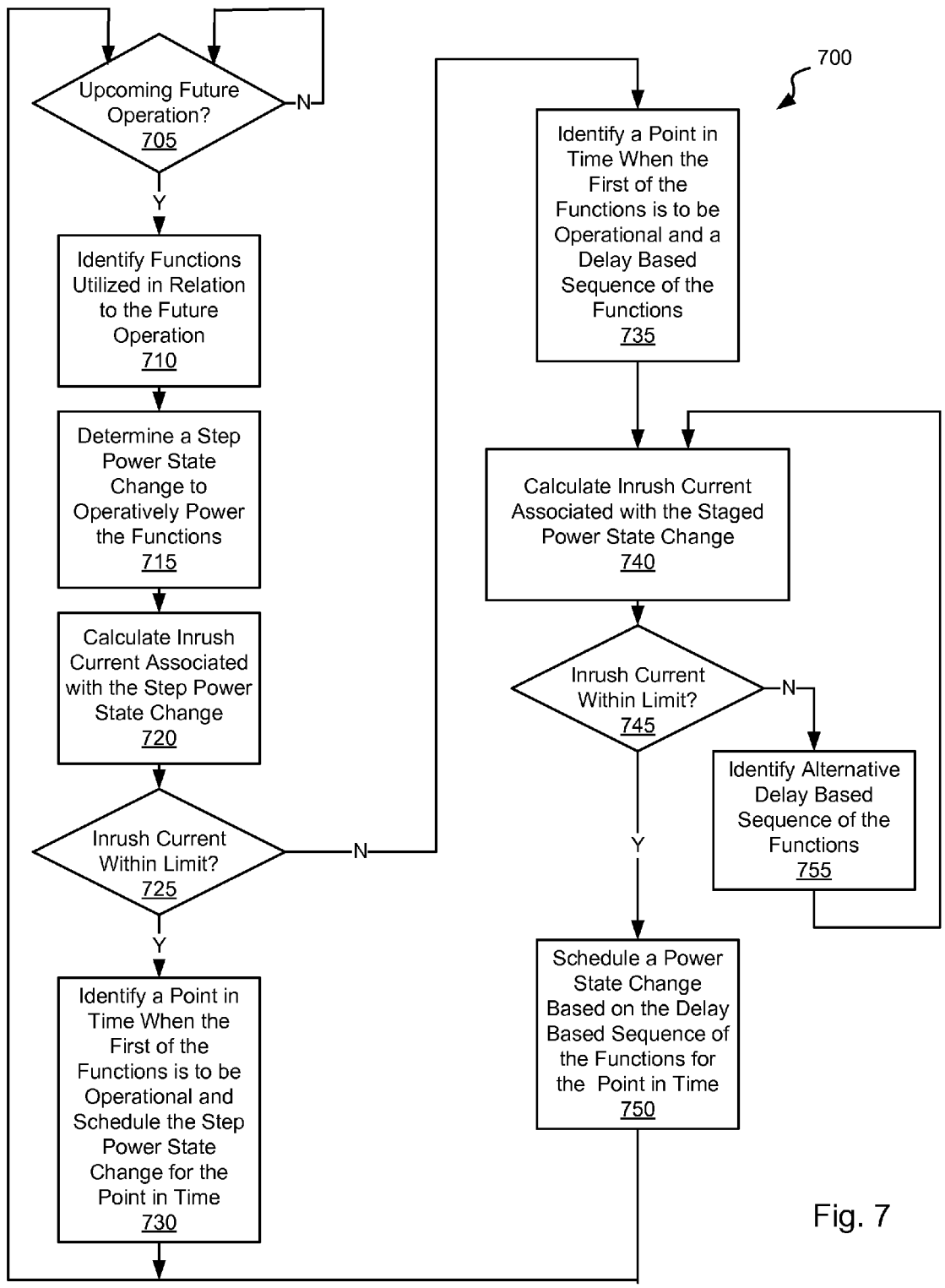
FIG. 7 is a flow diagram showing a method in accordance with some embodiments of the present invention for governing inrush current in a semiconductor device.

Turning to FIG. 7, a flow diagram 700 shows a method in accordance with some embodiments of the present invention for governing inrush current in a semiconductor device. Following flow diagram 700, it is determined whether an upcoming future operation is expected (block 705). This determination may be made, for example, by decoding an upcoming instruction. As another example, this determination may be made based upon the progress of upstream logic execution. Once the upcoming future operation is identified (block 705), functions/sub-functions that will be used to execute the upcoming future operation are identified (block 710). This includes identifying a sequential order in which the identified functions/sub-functions are expected to be used. A step power state change is identified that will operatively power the needed functions all at one time (block 715). An inrush current associated with the step power state change is calculated (block 720). This calculation may be accomplished by accessing a inrush current corresponding to the step power state change that was previously calculated and maintained in a memory or look-up table. It is then determined whether the inrush current associated with the step power state change is less than an acceptable limit (block 725). In some embodiments of the present invention, the acceptable limit is programmable. Where the inrush current is within range (block 725), a point in the future when the first of the identified functions/sub-functions are to be used is identified, and the step power state transition is scheduled for that point in time (block 730). Thus, for example, where the point in time is ten clock cycles in the future and it takes three clock cycles to complete the step power state change, then the power state change is scheduled to begin seven or fewer clock cycles in the future to assure that the desired functions/sub-functions are operatively powered in time.

Alternatively, where the inrush current is not within range (block 725), a point in the future when the first of the identified functions/sub-functions are to be used is identified, and a delay based sequence of the functions/sub-functions is identified (block 735). Such a sequence may identify one or more functions/sub-functions that may have their power state change done after the function that is expected to execute first. This staged or ramped approach is similar to that described in relation to FIG. 4 above. The inrush current for the staged power state change is calculated (block 740). This calculation may be accomplished by accessing a inrush current that was previously calculated and maintained in a memory or look-up table. It is then determined whether the inrush current associated with the staged power state change is less than an acceptable limit (block 745). Where the inrush current is less than the acceptable limit (block 745), the staged power state change including the current delay based sequence of the functions/sub-functions are scheduled for the point of time in the future (block 750). Thus, for example, where the point in time is ten clock cycles in the future and it takes three clock cycles to complete the power state change for the first function/sub-function to be operational, then the power state change is scheduled to begin seven or fewer clock cycles in the future to assure that the desired functions/sub-functions are operatively powered in time. The power state changes for other functions/sub-functions are scheduled from the beginning point in accordance with the delay sequence. Alternatively, where the inrush current is not within the acceptable limit (block 745), another delay based sequence of the functions/sub-functions is identified (block 755). The processed of blocks 740 through 755 are repeated until an acceptable delay based sequence of the power state change is identified.

Figure 8:
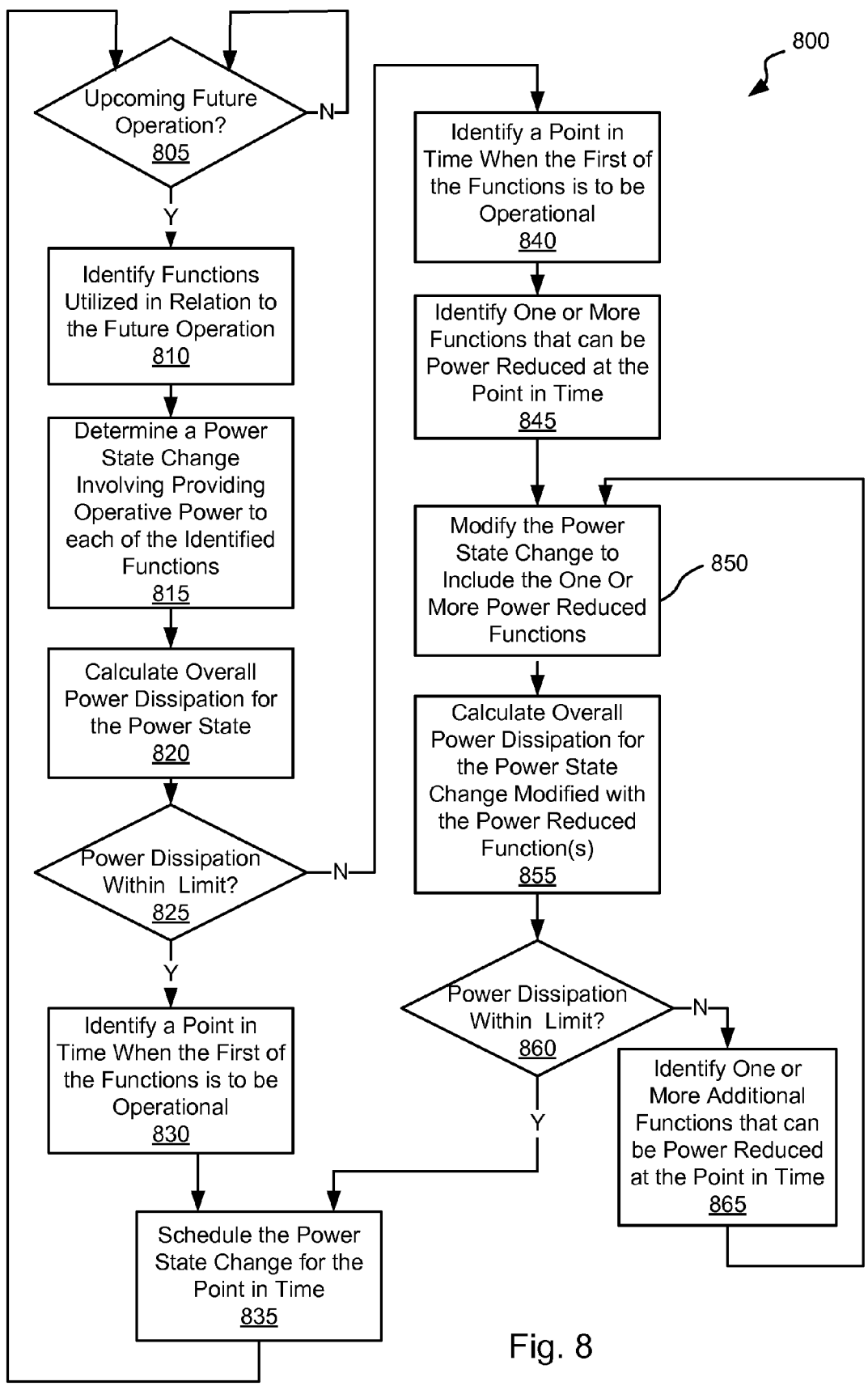
FIG. 8 is a flow diagram showing a method in accordance with some embodiments of the present invention for dynamically governing overall power dissipation in a semiconductor device.

Turning to FIG. 8, a flow diagram 800 shows a method in accordance with some embodiments of the present invention for staging power state changes in a semiconductor device to govern inrush current in a semiconductor device. Following flow diagram 800, it is determined whether an upcoming future operation is expected (block 805). This determination may be made, for example, by decoding an upcoming instruction. As another example, this determination may be made based upon the progress of upstream logic execution. Once the upcoming future operation is identified (block 805), functions/sub-functions that will be used to execute the upcoming future operation are identified (block 810). A power state change is identified that will operatively power the needed functions along with other currently powered functions together (block 815). An overall power dissipation for the power state is calculated (block 820). This calculation may be accomplished by accessing a power dissipation value corresponding to the power state that was previously calculated and maintained in a memory or look-up table. It is then determined whether the overall power dissipation is within a defined power dissipation limit (block 825). In some embodiments of the present invention, the defined power dissipation limit is programmable. Where the overall power dissipation is within range (block 825), a point in the future when the first of the identified functions/sub-functions are to be used is identified (block 830), and the power state transition is scheduled for that point in time (block 835). Thus, for example, where the point in time is ten clock cycles in the future and it takes three clock cycles to complete the step power state change, then the power state change is scheduled to begin seven or fewer clock cycles in the future to assure that the desired functions/sub-functions are operatively powered in time.

Alternatively, where the overall power dissipation is not within range (block 825), a point in the future when the first of the identified functions/sub-functions are to be used is identified (block 840). One or more functions/sub-functions that will not need to be operatively powered at that point are identified (block 845). The power state change is then modified to reduce the power state of one or more of the functions/sub-functions that will not need to be operatively powered at that point (block 850). The overall power dissipation is then recalculated to account for the reduced power state of the function(s)/sub-function(s) (block 855). It is then determined whether the overall power dissipation is within a defined power dissipation limit (block 860). Where the overall power dissipation is within range (block 860), the power state transition including the identified reduced power states is scheduled for the previously identified point in time (block 835). Alternatively, where the overall power dissipation is not within range (block 860), one or more additional functions/sub-functions that can be powered reduced are identified (block 865), and the processes of blocks 850 through 860 are repeated. Ultimately, the processed of blocks 850 through 8655 are repeated until a power state change is found that assures operation within the desired power dissipation limit.

Figure 9A:
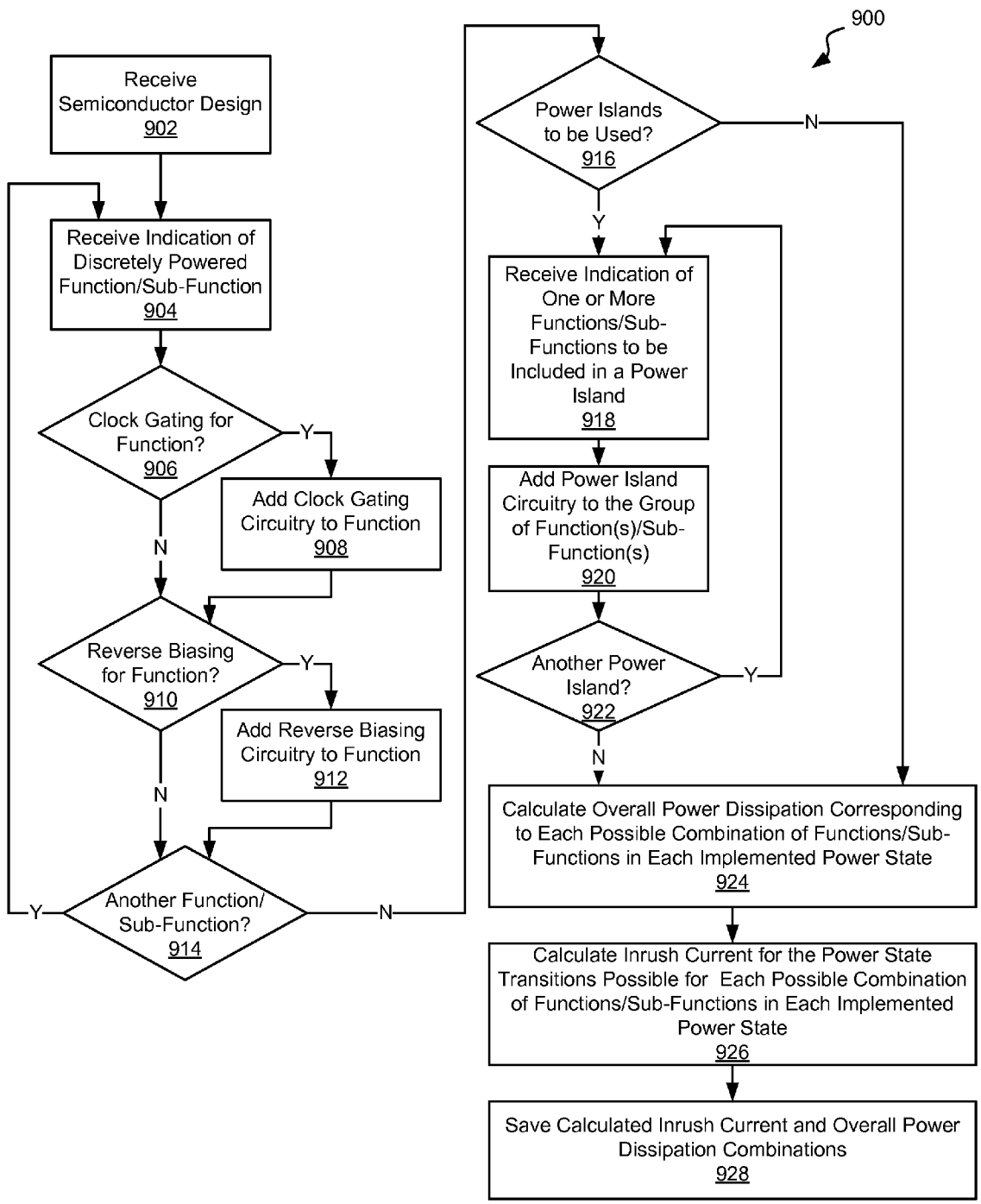
FIGS. 9a-9b is a flow diagram showing a method in accordance with some embodiments of the present invention for designing a semiconductor device including power state change control in accordance with different embodiments of the present invention.

Turning to FIG. 9a, a flow diagram 900 shows a method in accordance with some embodiments of the present invention for implementing power state change circuitry and calculating corresponding power state change parameters. Following flow diagram 900, a semiconductor design is received (block 902). The semiconductor design may be in any format known in the art. For example, the semiconductor design may be in VHDL design language. Based upon the disclosure provided herein, one of ordinary skill in the art will recognize a variety of formats in which the semiconductor design may be presented. The semiconductor design includes a number of functions/sub-functions that together provide the functionality of the semiconductor design. It is often true that only a subset of functions/sub-functions are operational at any given point in time providing for power reduction and/or management opportunities.

An indication of a discretely powered function/sub-function is received (block 904). This may include, for example, a user input identifying a portion of the semiconductor design that is to be treated together for the purposes of power management. It is determined whether clock gating functionality is to be applied to the identified function/sub-function (block 906). Where clock gating is to be applied (block 906), the semiconductor design is augmented to add clock gating circuitry to the identified function/sub-function (908). It is then determined whether reverse biasing power reduction capability is to be incorporated with the identified function/sub-function (block 910). Where reverse biasing is to be applied (block 910), the semiconductor design is augmented to add reverse biasing circuitry to the identified function (912). It is then determined whether any more functions/sub-functions remain to be processed (block 914). Where more remain (block 914), the processes of blocks 904 through 914 are repeated until all functions/sub-functions are processed.

Alternatively, where no more functions/sub-functions remain (block 914), it is determined whether power islands are to be used in the semiconductor design (block 916). Where power islands are to be used (block 916), an indication of one or more functions/sub-functions that are to be combined in a power island is received (block 918). In addition, a power island is called for and the semiconductor design is augmented to include power island control circuitry to control the power island for the group of functions/sub-functions (block 920). It is then determined whether additional power islands are to be implemented (block 922). The processes of blocks 918-922 are repeated until all power islands are designated.

Once all power islands have been designated (block 922), the overall power dissipation of the semiconductor design is calculated for all possible combinations of functions/sub-functions in each possible power state (block 924). Further, the inrush current for transitions from each possible power state are calculated (block 926). The calculated overall power dissipations and inrush currents are stored for later use (block 928).

Figure 9B:
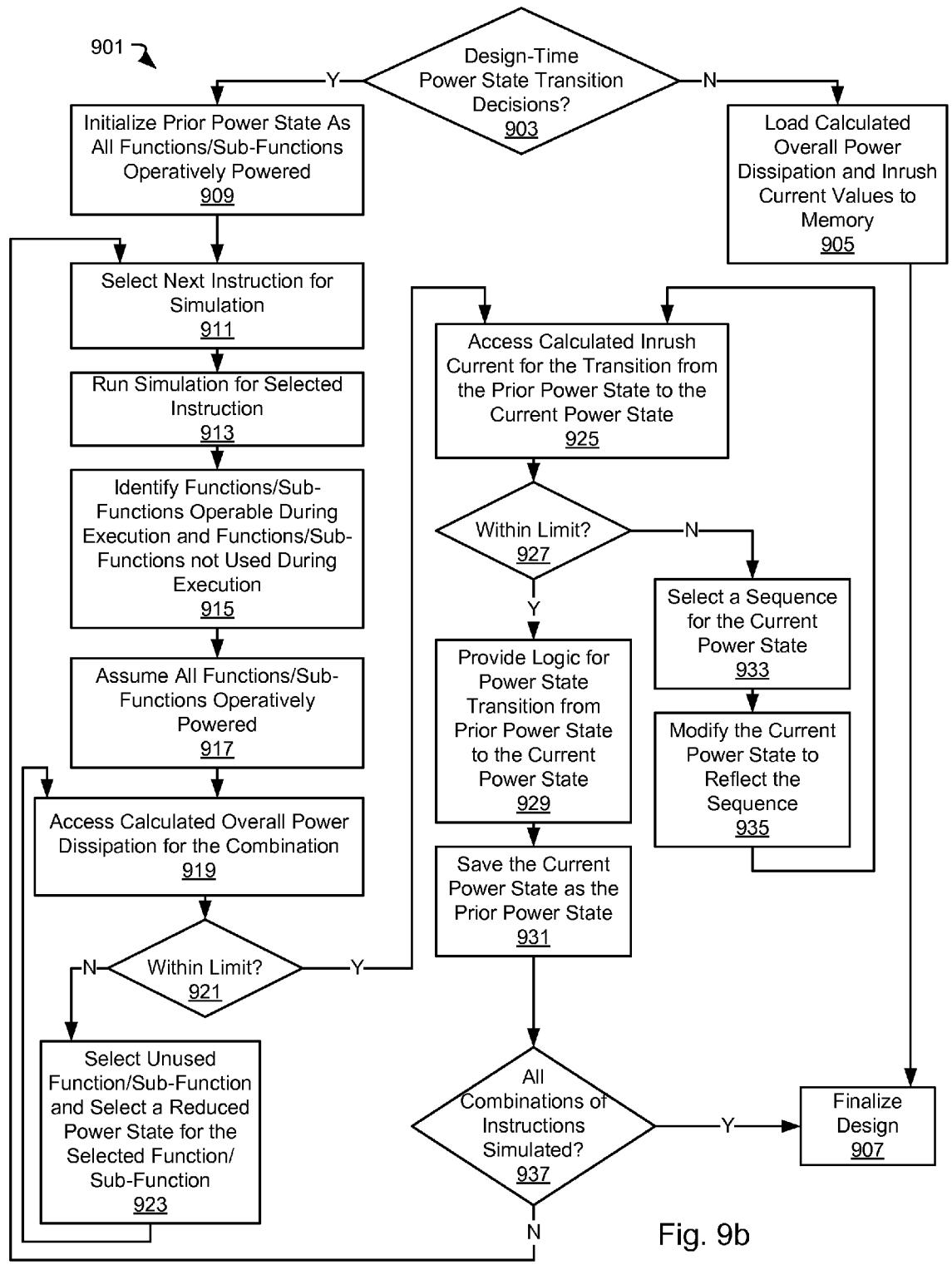

Turning to FIG. 9b, a flow diagram 901 shows a method in accordance with some embodiments of the present invention for utilizing the power state change parameters calculated in flow diagram 900 to implement power state change logic at design time. Following flow diagram 901 it is determined whether design-time power state transitions are desired (block 903). Design-time power state transitions are power state transitions that are determined at design time, and hard coded in the semiconductor design. In contrast, run-time power state transitions are possible where the semiconductor device is loaded with information related to all possible power state transitions, and the implemented circuits are designed to dynamically determine the next power state transition. Where design-time power state transitions are not desired (block 903), the previously stored inrush current values and overall power dissipation values are loaded to a memory in the semiconductor design (block 905) and the design is finalized (block 907).

Alternatively, where design-time power state transitions are desired (block 903), an initial power state where all functions/sub-functions are simultaneously powered in a fully operative state is selected (block 909). An instruction is then selected for simulated operation of the semiconductor design (block 911), and simulation using the instruction is run (block 913). Such instructions may be, but are not limited to, actual instructions expected during run time of the device or a test bench of signals designed to exercise the circuit. In executing the instruction, it is identified which of the discretely powered functions/sub-functions are operated during execution of the instruction, and which functions/sub-functions are not used (block 915). It is then assumed that all functions/sub-functions are operatively powered (block 917).

The stored overall power dissipation value corresponding to the power state (see steps 924, 926) is accessed (block 919). This overall power dissipation value is compared with a defined power dissipation limit to determine if the power state is within a desired range (block 921). Where the power dissipation value is too high, one of the unused functions/sub-functions is selected, and a reduced power state is selected for the function/sub-function to establish a modified power state (block 923). The overall power dissipation for the new power state is accessed from the earlier stored values (see steps 924, 926) (block 919), and this overall power dissipation value is compared with a defined power dissipation limit to determine if the power state is within a desired range (block 921). Where the dissipation value is still outside of the desired range (block 921), the processes of blocks 919-923 is repeated for another modified power state.

Alternatively, where the modified power state is within the desired range (block 921), the previously stored value of inrush current for the modified power state is accessed (block 925). This value is compared with a maximum allowable inrush current to determine if it is within an acceptable range (block 927). Where the inrush current is not within an acceptable range (block 927), a sequence for the power state transition is selected (block 933). This sequence includes a sequence of power state changes for individual functions/sub-functions that are being moved from a reduced power states. The sequence can be based on the preceding simulation (block 913) that indicates relative points in time when the individual functions/sub-functions need to be operatively powered. The current power state is modified to reflect the selected sequence (block 935), and the processes of blocks 925 through 927 are repeated for the modified power state. The process of modifying the sequence of power state transitions is repeated until an acceptable level of inrush current is identified.

Alternatively, where the inrush current is within an acceptable range (block 927), logic for the transition from the prior power state to the current power state is implemented in the semiconductor design (block 929). In addition, the current power state is saved as the prior power state for purposes of calculating the next power state transition (block 931). At this juncture, it is determined whether all combinations of instructions have been simulated (block 937). Where all combinations have been exhausted (block 937), the design is finalized (block 907). Alternatively, where all combinations have not yet been exhausted (block 937), the processes of blocks 911 through 937 are repeated until all combinations are exhausted.

Figure 10:
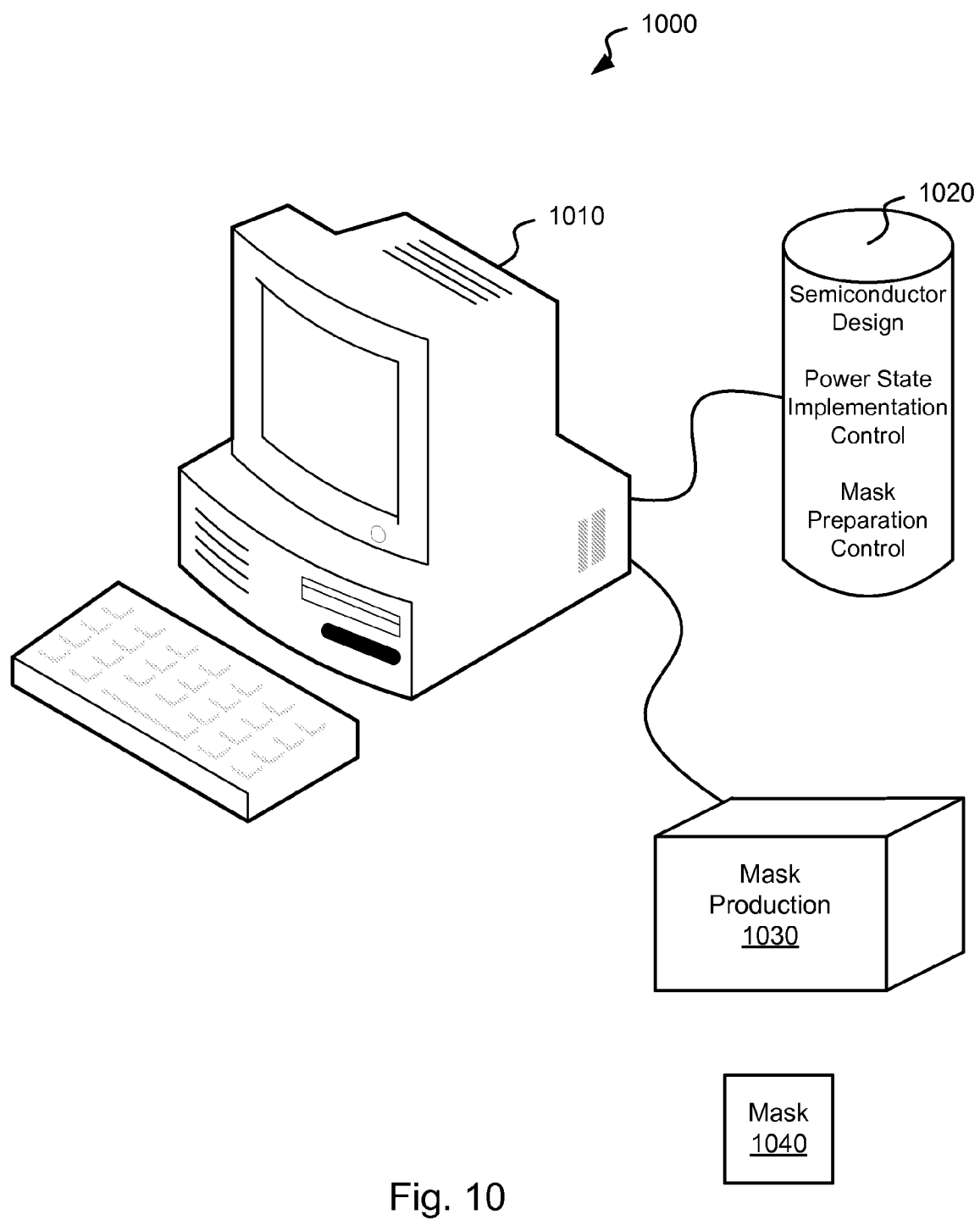
FIG. 10 depicts a semiconductor device design system in accordance with one or more embodiments of the present invention.

Turning to FIG. 10, a semiconductor device design system 1000 is shown in accordance with one or more embodiments of the present invention. Semiconductor device design system 1000 includes a microprocessor based system or device 1010 (e.g., a computer) with a microprocessor capable of executing instructions. Such instructions may be, for example, software or firmware instructions as are known in the art. These instructions may be maintained on a computer readable medium 1020. Computer readable medium 1020 may be any media known in the art that is capable of storing information that can be retrieved later. Thus, for example, computer readable medium may be a hard disk drive, a random access memory, a tape drive, or any combination of the aforementioned or the like. Computer 1010 provides instructions to a mask production system 1030. Mask production system 1030 may be any device or system that is capable of receiving semiconductor design information from computer 1010 and producing on or more semiconductor manufacturing masks 1040 based upon that information. Based upon the disclosure provided herein, one of ordinary skill in the art will recognize a variety of mask production systems and/or other semiconductor manufacturing systems and/or devices that may receive design information from computer 1010 and manufacture a semiconductor device based on that design information.

In operation, computer 1010 accesses a semiconductor design maintained on computer readable medium and augments the semiconductor design to include power state change control. Augmentation with such power state change control may be similar to that described above in relation to FIGS. 9a-9b. Once the semiconductor design is augmented, the augmented semiconductor design is used to form one or more masks that may be used by semiconductor manufacturing device to manufacture a corresponding semiconductor device using processes known in the art.

In conclusion, the invention provides novel systems, devices, methods and arrangements for providing power state control in a semiconductor device. While detailed descriptions of one or more embodiments of the invention have been given above, various alternatives, modifications, and equivalents will be apparent to those skilled in the art without varying from the spirit of the invention. For example, while FIGS. 3 and 5 provide block diagrams of particular device architectures, one of ordinary skill in the art will recognize other device architectures to which the power control circuits and processes described herein may be applied. Further, while the application refers to inrush current as being affected by a sudden increase in current, various embodiments of the present invention may be used to spread sudden decreases in current as well. As such, inrush current may include overshoot similar to that described herein, and may include undershoot caused by a rapid decrease in current needs. Therefore, the above description should not be taken as limiting the scope of the invention, which is defined by the appended claims.

What is claimed is:

1. A semiconductor device, wherein the semiconductor device comprises:
   a first function circuit;
   a second function circuit;
   a power state change control circuit, wherein the power state change control circuit is operable to determine a combination of power states of the first function circuit and the second function circuit that provides an overall power dissipation within a power dissipation level
   an instruction decoder circuit, wherein the instruction decoder circuit is operable to decode a received instruction to provide a decoded instruction, and wherein execution of the received instruction involves execution of the first function circuit and not the second function circuit; and
   a next process scheduler circuit, wherein the next process scheduler circuit is operable to schedule a transition to the power states determined for the first function circuit and the second function circuit at a defined time, and wherein the defined time is predictively determined based at least in part on the decoded instruction.

2. The semiconductor device of claim 1, wherein the power states of the first function circuit and the second function circuit includes transitioning the first function circuit to an operative power state, and transitioning the second function circuit to a reduced power state.

3. The semiconductor device of claim 2, wherein the second function circuit is powered by a power island, and wherein transitioning the second circuit to the reduced power state includes removing power from the power island.

4. The semiconductor device of claim 2, wherein the second function circuit utilizes a system clock that is gated and un-gated using a clock gating circuit, and wherein transitioning the second circuit to the reduced power state includes gating the system clock.

5. The semiconductor device of claim 2, wherein the second function circuit includes a first sub-function circuit and a second sub-function circuit, and wherein the reduced power state reduces power consumption by the first sub-function circuit and maintains power consumption by the second sub-function circuit.

6. The semiconductor device of claim 1, wherein the power dissipation level is programmable.

7. The semiconductor device of claim 1, wherein the combination of power states of the first function circuit and the second function is dynamically determined at run-time.

8. The semiconductor device of claim 7, wherein the semiconductor device further comprises:
  a lookup table having power dissipation values corresponding to different power states of the first function circuit and the second function circuit; and
  wherein the overall power dissipation corresponding to the combination of the power states of the first function circuit and the second function circuit is derived from one or more power dissipation values accessed from the lookup table.

9. The semiconductor device of claim 1, wherein the combination of power states of the first function circuit and the second function is statically determined at design-time.

10. The semiconductor device of claim 1, wherein the semiconductor device further comprises:
  a comparator circuit operable to compare the overall power dissipation corresponding to the combination of the power states of the first function circuit and the second function circuit with the power dissipation level.

11. A method for maintaining power dissipation in a semiconductor device within a defined limit, the method comprising:
  providing a semiconductor device including a first function circuit and a second function circuit;
  determining a power state transition for the semiconductor device, wherein the power state transition includes transitioning the power state of both the first function circuit and the second function circuit;
  determining a combination of power states of the first function circuit and the second function circuit that provides an overall power dissipation within a power dissipation level;
  decoding a received instruction to provide a decoded instruction; and
  scheduling a transition to the combination of power states determined for the first function circuit and the second function circuit at a defined time, wherein the defined time is predictively determined based at least in part on the decoded instruction.

12. The method of claim 11, wherein transitioning the first function circuit and the second function circuit to the determined combination of power states is done at a defined time, and wherein the method further comprises:
  receiving an instruction, wherein execution of the instruction includes use of the first function circuit and not the second function circuit; and
  predictively determining the defined time based at least in part on the instruction, wherein the defined time is before the first function circuit is to be used to execute the instruction.

13. The method of claim 12, wherein identifying the defined time is further based in part on an operational status of the semiconductor device.

14. The method of claim 11, wherein the power dissipation level is programmable.

15. The method of claim 11, wherein the power states of the first function circuit and the second function circuit include transitioning the first function circuit to an operative power state, and transitioning the second function circuit to a reduced power state.

16. The method of claim 15, wherein the second function circuit is powered by a power island, and wherein transitioning the second circuit to the reduced power state includes removing power from the power island.

17. The method of claim 15, wherein the second function circuit utilizes a system clock that is gated and un-gated using a clock gating circuit, and wherein transitioning the second circuit to the reduced power state includes gating the system clock.

18. A hard disk drive controller, wherein the hard disk drive controller includes:
  a first function circuit;
  a second function circuit; and
  a power state change control circuit, wherein the power state change control circuit includes:
  an instruction decoder operable to receive an instruction and to identify at least the first function circuit and the second function circuit for execution of the instruction; and
  a next process scheduler circuit, wherein the next process scheduler circuit is operable to determine a combination of power states of the first function circuit and the second function circuit that provides an overall power dissipation within a power dissipation level, and to schedule a transition of the determined power states, wherein the combination of power states of the first function circuit and the second function is dynamically determined at run-time.

19. The hard disk drive controller of claim 18, wherein the power states of the first function circuit and the second function circuit includes transitioning the first function circuit to an operative power state, and transitioning the second function circuit to a reduced power state.

20. A semiconductor device, wherein the semiconductor device comprises:
  a first function circuit;
  a second function circuit;
  a power state change control circuit, wherein the power state change control circuit is operable to determine a combination of power states of the first function circuit and the second function circuit that provides an overall power dissipation within a power dissipation level, and wherein the combination of power states of the first function circuit and the second function is dynamically determined at run-time;
  an instruction decoder circuit, wherein the instruction decoder circuit is operable to decode a received instruction to provide a decoded instruction, and wherein execution of the received instruction involves execution of the first function circuit and not the second function circuit; and
  a next process scheduler circuit, wherein the next process scheduler circuit is operable to schedule a transition to the power states determined for the first function circuit and the second function circuit at a defined time, and wherein the defined time is predictively determined based at least in part on the decoded instruction.

21. The semiconductor device of claim 20, wherein the semiconductor device further comprises:

a lookup table having power dissipation values corresponding to different power states of the first function circuit and the second function circuit; and wherein the overall power dissipation corresponding to the combination of the power states of the first function circuit and the second function circuit is derived from one or more power dissipation values accessed from the lookup table.

* * * * *